(12) United States Patent
Chang et al.

(10) Patent No.: US 12,243,979 B2
(45) Date of Patent: Mar. 4, 2025

(54) ALL-SOLID BATTERY AND METHOD OF PREPARING THE SAME

(71) Applicant: Samsung Electronics Co., Ltd., Suwon-si (KR)

(72) Inventors: Wonseok Chang, Seoul (KR); Jusik Kim, Hwaseong-si (KR); Gabin Yoon, Seoul (KR); Myungjin Lee, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 45 days.

(21) Appl. No.: 17/375,162

(22) Filed: Jul. 14, 2021

(65) Prior Publication Data
US 2022/0158226 A1 May 19, 2022

(30) Foreign Application Priority Data

Nov. 19, 2020 (KR) .................. 10-2020-0155430

(51) Int. Cl.
*H01M 10/0562* (2010.01)
*H01M 4/02* (2006.01)
(Continued)

(52) U.S. Cl.
CPC ..... *H01M 10/0562* (2013.01); *H01M 4/0404* (2013.01); *H01M 4/0407* (2013.01);
(Continued)

(58) Field of Classification Search
CPC .. H01M 4/0404; H01M 4/0407; H01M 4/131; H01M 4/133; H01M 4/134;
(Continued)

(56) References Cited

U.S. PATENT DOCUMENTS

| 7,700,465 B2 | 4/2010 | Collins et al. |
| 10,516,166 B2 | 12/2019 | Fu et al. |

(Continued)

FOREIGN PATENT DOCUMENTS

| CN | 109728291 A | 5/2019 |
| JP | 2008135287 A | 6/2008 |

(Continued)

OTHER PUBLICATIONS

Extended European Search Report issued on Feb. 7, 2022 in corresponding EP Patent Application No. 21189565.1, 9 pp.

*Primary Examiner* — Matthew T Martin
*Assistant Examiner* — Ankith R Sripathi
(74) *Attorney, Agent, or Firm* — CANTOR COLBURN LLP

(57) ABSTRACT

The all-solid battery includes: a cathode layer including a cathode active material layer, an anode layer, and a solid electrolyte layer that is disposed between the cathode layer and the anode layer and includes a solid electrolyte, wherein the anode layer includes a porous anode current collector; a first anode active material layer including a first metal and a carbonaceous anode active material disposed on the porous anode current collector; a conformal coating layer including a second metal disposed on the first anode active material layer, wherein the conformal coating layer of the anode layer is between the first anode active material layer and the solid electrolyte layer, and a surface roughness of the solid electrolyte layer, proximate to the conformal coating layer, is about 2 micrometers or less.

25 Claims, 14 Drawing Sheets

(51) Int. Cl.
   *H01M 4/04*     (2006.01)
   *H01M 4/131*    (2010.01)
   *H01M 4/1391*   (2010.01)
   *H01M 4/36*     (2006.01)
   *H01M 4/505*    (2010.01)
   *H01M 4/525*    (2010.01)
   *H01M 4/583*    (2010.01)
   *H01M 4/66*     (2006.01)
   *H01M 4/80*     (2006.01)
   *H01M 10/0525*  (2010.01)

(52) U.S. Cl.
   CPC ......... *H01M 4/131* (2013.01); *H01M 4/1391* (2013.01); *H01M 4/366* (2013.01); *H01M 4/505* (2013.01); *H01M 4/525* (2013.01); *H01M 4/583* (2013.01); *H01M 4/662* (2013.01); *H01M 4/667* (2013.01); *H01M 4/80* (2013.01); *H01M 10/0525* (2013.01); *H01M 2004/021* (2013.01); *H01M 2300/0071* (2013.01)

(58) Field of Classification Search
   CPC .. H01M 4/139; H01M 4/1391; H01M 4/1393; H01M 4/1395; H01M 4/366; H01M 4/505; H01M 4/525; H01M 4/583; H01M 4/587; H01M 4/62; H01M 4/626; H01M 4/662; H01M 4/667; H01M 4/80; H01M 10/0525; H01M 10/0562; H01M 10/058; H01M 10/4235; H01M 2004/021; H01M 2004/027; H01M 2300/0071
   See application file for complete search history.

(56) References Cited

U.S. PATENT DOCUMENTS

| | | | |
|---|---|---|---|
| 11,127,589 B2 | 9/2021 | Zaitsu et al. | |
| 11,591,236 B2* | 2/2023 | Asano | H01M 4/62 |
| 2003/0194598 A1* | 10/2003 | Chan | H01M 4/8605 |
| | | | 429/524 |
| 2012/0058385 A1 | 3/2012 | Reina et al. | |
| 2014/0272558 A1 | 9/2014 | Xiao et al. | |
| 2017/0263938 A1 | 9/2017 | Harutyunyan et al. | |
| 2017/0317334 A1 | 11/2017 | Yura et al. | |
| 2018/0123181 A1* | 5/2018 | Son | H01M 10/052 |
| 2018/0205112 A1 | 7/2018 | Thomas-Alyea et al. | |
| 2019/0020037 A1 | 1/2019 | Guo et al. | |
| 2019/0051933 A1 | 2/2019 | Li et al. | |
| 2019/0334165 A1* | 10/2019 | Huayu | H01M 4/133 |
| 2019/0379056 A1* | 12/2019 | Chen | H01M 10/052 |
| 2020/0067085 A1* | 2/2020 | Chae | H01M 4/139 |
| 2020/0136178 A1 | 4/2020 | Ku et al. | |
| 2020/0343580 A1* | 10/2020 | Yushin | H01M 10/617 |
| 2021/0111398 A1* | 1/2021 | Tanaami | H01M 4/043 |
| 2021/0210791 A1 | 7/2021 | Suzuki et al. | |
| 2021/0273220 A1* | 9/2021 | Yakovleva | H01M 10/0562 |
| 2021/0305581 A1* | 9/2021 | Mao | H01M 4/74 |
| 2021/0351410 A1* | 11/2021 | Son | H01M 4/587 |
| 2022/0013857 A1* | 1/2022 | Visco | C03B 15/02 |
| 2022/0045354 A1 | 2/2022 | Kim et al. | |
| 2022/0052375 A1* | 2/2022 | Ito | H01M 10/4235 |
| 2022/0123312 A1* | 4/2022 | Li | H01M 4/5815 |
| 2022/0399532 A1* | 12/2022 | Feng | H01M 10/052 |
| 2022/0407054 A1* | 12/2022 | Lim | H01M 10/0569 |
| 2023/0216044 A1* | 7/2023 | Nakano | H01M 10/052 |
| | | | 429/231.95 |

FOREIGN PATENT DOCUMENTS

| | | | |
|---|---|---|---|
| JP | 5375545 B2 | 12/2013 | |
| JP | 2015195183 A | 11/2015 | |
| JP | 5928252 B2 | 6/2016 | |
| JP | 2017162812 A | 9/2017 | |
| JP | 6432113 B2 | 12/2018 | |
| JP | 6621500 B2 | 12/2019 | |
| KR | 101162775 B1 | 7/2012 | |
| KR | 20170094966 | * 8/2017 | |
| KR | 1020190024761 A | 3/2019 | |
| KR | 1020200078479 A | 7/2020 | |
| KR | 1020200096422 A | 8/2020 | |
| WO | 2016117499 A1 | 7/2016 | |
| WO | WO-2022038670 A1 * | 2/2022 | ............ H01M 4/382 |

\* cited by examiner

ALL-SOLID BATTERY AND METHOD OF PREPARING THE SAME

CROSS-REFERENCE TO RELATED APPLICATION

This application claims priority to Korean Patent Application No. 10-2020-0155430, filed on Nov. 19, 2020, in the Korean Intellectual Property Office, and all the benefits accruing therefrom under 35 U.S.C. § 119, the content of which is incorporated herein by reference in its entirety.

BACKGROUND

1. Field

The present disclosure relates to an all-solid battery and a method of preparing the all-solid battery.

2. Description of the Related Art

Recently, batteries having improved energy density and safety have been actively developed in accordance with industrial demand. For example, lithium-ion batteries have been put to practical use in the automotive industry as well as in information-related equipment and communication equipment. In the automotive industry, safety is particularly important as it can minimize injury and save lives.

Commercially available lithium-ion batteries use an electrolytic solution including a flammable organic solvent, and thus there is a possibility of overheating and fire when a short-circuit occurs. As a result, an all-solid battery using a solid electrolyte instead of an electrolytic solution has been proposed.

Since an all-solid battery does not use a flammable organic solvent, the possibility of fire or an explosion may be greatly reduced even when a short-circuit occurs. Therefore, such an all-solid battery may greatly enhance safety as compared with a lithium-ion battery using an electrolytic solution.

SUMMARY

Provided is an all-solid battery having improved life characteristics by maintaining an electrical conductivity in an anode during battery operation.

Provided is a method of preparing the all-solid battery.

Additional aspects will be set forth in part in the description which follows and, in part, will be apparent from the description, or may be learned by practice of the presented embodiments of the disclosure.

According to an aspect of an embodiment, an all-solid battery includes: a cathode layer including a cathode active material layer; an anode layer; and a solid electrolyte layer disposed between the cathode layer and the anode layer and includes a solid electrolyte, wherein the anode layer includes a porous anode current collector, a first anode active material layer including a first metal and a carbonaceous anode active material disposed on the porous anode current collector, and a conformal coating layer including a second metal disposed on the first anode active material layer, wherein the conformal coating layer is between the first anode active material layer and the solid electrolyte layer, and a surface roughness of a surface of the solid electrolyte layer proximate to the conformal coating layer is about 2 micrometers (μm) or less.

In another aspect, An all-solid battery includes a cathode layer comprising a cathode active material layer; an anode layer; and a solid electrolyte layer disposed between the cathode layer and the anode layer and comprising a solid electrolyte, wherein the anode layer comprises a porous anode current collector, a first anode active material layer comprising a first metal and a carbonaceous anode active material disposed on the porous anode current collector, the first metal comprising at least one of indium, silicon, gallium, tin, aluminum, titanium, zirconium, niobium, germanium, antimony, bismuth, gold, platinum, palladium, magnesium, silver, or zinc, and a conformal coating layer including a second metal disposed on the first anode active material layer, the second metal in the conformal coating layer comprising silver, copper, or a combination thereof, wherein the conformal coating layer is between the first anode active material layer and the solid electrolyte layer, and has a thickness of about 200 nanometers or less, and a surface roughness of a surface of the solid electrolyte layer proximate to the conformal coating layer is about 2 micrometers or less.

According to an aspect of an embodiment, a method of preparing an all-solid battery includes: providing a solid electrolyte layer; forming a conformal coating layer including a second metal on a first surface of the solid electrolyte layer including a solid electrolyte; forming, on the conformal coating layer, a first anode active material layer including a carbonaceous anode active material and a first metal; disposing a porous anode current collector on the first anode active material layer to prepare an anode layer; and disposing a cathode layer on a second surface of the solid electrolyte layer to prepare the all-solid battery.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
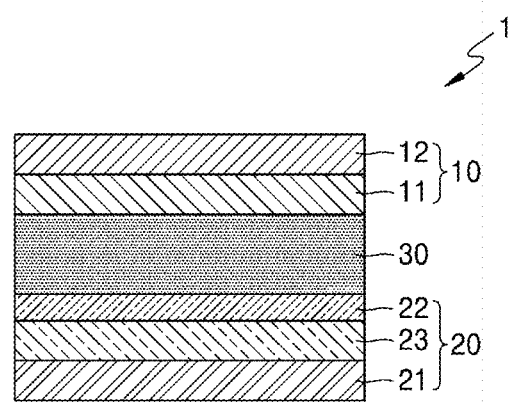
FIG. 1A is a schematic view of an embodiment of a structure of an all-solid battery including a conformal coating.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to one or more embodiments, an all-solid battery and a method of preparing the all-solid battery will be described in detail.

Provided is an all-solid battery including: a cathode layer including a cathode active material layer, an anode layer, and a solid electrolyte layer disposed between the cathode layer and the anode layer and including a solid electrolyte, wherein the anode layer includes a porous anode current collector; a first anode active material layer including a first metal and a carbonaceous anode active material disposed on the porous anode current collector; and a conformal coating layer including a second metal disposed on the first anode active material layer, wherein the conformal coating layer is between the first anode active material layer and the solid electrolyte layer, and a surface roughness of a surface of the solid electrolyte layer proximate to which the conformal coating layer is about 2 micrometers (μm) or less.

An all-solid battery including the solid electrolyte layer including an oxide solid electrolyte has gaps or fine cracks generated on the solid electrolyte layer after cutting or polishing of the solid electrolyte layer in the preparation process, and thus the solid electrolyte layer has a rough surface. After stacking and pressing an anode on the solid electrolyte layer, current concentration can occur in some regions, and there is a risk of short-circuit in the all-solid battery due to the separation of interlayers caused by expansion and contraction of the all-solid battery. Also, an interfacial resistance at an interface of the solid electrolyte layer and the anode layer increases, and thus internal resistance of the all-solid battery increases, which may result in deterioration of cycle characteristics of the all-solid battery.

Also, due to relatively uniform current distribution at the interface between the solid electrolyte and the anode layer, when a constant current-constant voltage (CC-CV) charging is applied to the all-solid battery, a constant voltage section of the charging occupies about 94% of the total capacity of the battery, and thus the high rate characteristics that are directly related to rapid charging of battery may be decreased, which may result in an increase in a probability of short-circuit during charging as well.

In order to resolve these problems described above, the present inventors have discovered an all-solid battery having an anode layer, in which a conformal coating layer having excellent conformality is arranged on a solid electrolyte layer, and a first anode active material layer and a porous anode current collector are sequentially stacked on the conformal coating layer.

According to an embodiment, an all-solid battery includes a cathode layer including a cathode active material layer; an anode layer; and a solid electrolyte layer disposed between the cathode layer and the anode layer and includes a solid electrolyte. The anode layer includes a porous anode current collector; a first anode active material layer including a first metal and a carbonaceous anode active material; and a conformal coating layer including a second metal, and the conformal coating layer is disposed proximate or adjacent to the solid electrolyte layer.

Provided is an all-solid battery, where a surface roughness of a surface of the solid electrolyte layer disposed proximate or adjacent to the conformal coating layer is about 2 μm or less.

The solid electrolyte layer has a first surface and a second surface. The first surface faces the conformal coating layer and the second surface is opposite to the first surface. The surface roughness of the first surface of the solid electrolyte layer arranged proximate or adjacent to the conformal coating layer may be, for example, in a range of about 0.1 micrometer (μm) to about 2 μm, about 0.1 μm to about 1.8 μm, about 0.2 μm to about 1.7 μm, about 0.3 μm to about 1.5 μm, about 0.5 μm to about 1.4 μm, or about 0.8 μm to about 1.2 μm. A surface roughness of the second surface of the solid electrolyte layer may be in a range of about 5 μm to about 20 μm, about 8 μm to about 20 μm, about 10 μm to about 20 μm, about 15 μm to about 20 μm, or, for example, about 20 μm. The solid electrolyte layer having a surface roughness outside these ranges may not have a satisfactory adhesive strength with respect to a layer formed on the solid electrolyte layer and thus improvement in this regard is desired. When the surface roughness of the first surface of the solid electrolyte layer proximate or adjacent to the conformal coating layer is greater than about 2 μm, interfacial resistance of the solid electrolyte layer and the anode layer may increase. On the contrary, when the surface roughness of the first surface of the solid electrolyte layer is equal to or less than about 2 μm, cracks in the solid electrolyte layer during charging/discharging of the all-solid battery may be suppressed, and thus a short-circuit of the all-solid battery may be suppressed.

As used herein, the surface roughness of the solid electrolyte layer may be evaluated by analysis of a cross-section of the solid electrolyte layer by a scanning electron microscopy (SEM). In further detail, the cross-section of the stack including the solid electrolyte layer of the all-solid battery is cut, and an image of the cross-section is taken using the SEM. In the cross-sectional view, a region in which the cathode layer, solid electrolyte layer, and anode layer are stacked in a vertical direction is selected. For the roughness analysis, a 100 μm portion of the interface between the solid electrolyte and the cathode layer in a direction parallel to the stacked surfaces of the cathode layer, solid electrolyte layer, and anode layer is selected, and the roughness of the interface in this region is traced to obtain a roughness curve. Also, the surface roughness (e.g., arithmetic mean roughness Ra) of the solid electrolyte layer is obtained from the roughness curve based on a straight line drawn in a direction parallel to the stacking surface.

The conformal coating layer does not participate in the charging/discharging reaction and lithium electrodeposition of the battery but participates in reducing interfacial resistance and improving current uniformity, and thus the conformal coating layer may improve short-circuit prevention characteristics of the battery.

The conformal coating layer refers to a coating layer having excellent conformality.

As used herein, the term "conformality" is defined as a so-called step coverage, which may be defined by i) a percentage of a y-axis film formation rate to an x-axis film formation rate or ii) a ratio of an average thickness of a layer formed in a vertical direction to an average thickness of a layer formed in a horizontal direction. A conformality of the conformal coating layer may be in a range of about 80% to about 100%, about 82% to about 100%, about 83% to about 99%, about 85% to about 99%, or about 90% to about 95%. Here, the conformality may be observed through an SEM.

When the first anode active material layer includes a carbonaceous anode active material, expansion and contraction of the first metal capable of reacting with lithium, of which a volume is expandable, may be reduced by the carbonaceous anode active material. When a porous anode current collector having an electric conductivity is disposed on a surface of the first anode active material layer opposite the conformal coating layer, lithium ions transferred during charging may be electrodeposited into pores of the porous anode current collector. When a battery has this structure, problems of a battery associated with volume expansion and contraction may be minimized or avoided, and a short-circuit of the battery may be effectively suppressed.

When the conformal coating layer, which is a dense layer, is formed on a rough surface of the solid electrolyte layer, fine cracks or gaps are filled with the conformal coating layer, thus a surface morphology of the solid electrolyte layer may be effectively controlled such that interfacial resistance between the solid electrolyte layer and the anode layer may be reduced.

The conformal coating layer may be formed by physical deposition, chemical deposition, electrochemical deposition, or a combination thereof, using a second metal-including precursor, to have an excellent conformality. Here, the chemical deposition method may use, for example, precipitation, Tollen's reaction, or a pyrolysis reaction. The physical deposition method may comprise sputtering. The electrochemical deposition may comprise plating.

A thickness of the conformal coating layer may be about 500 nanometers (nm) or less or be in a range of about 1 nm to about 300 nm, about 10 nm to about 200 nm, about 10 nm to about 100 nm, about 30 nm to about 80 nm, or about 35 nm to about 60 nm. When the thickness of the conformal coating layer is within these ranges, separation of the solid electrolyte layer and the anode layer structure may be reduced, and interfacial resistance between the solid electrolyte layer and the anode layer may be reduced.

The second metal may be, for example, silver (Ag), copper (Cu), gold (Au), aluminum (Al), magnesium (Mg), tungsten (W), nickel (Ni), iron (Fe), indium (In), silicon (Si), gallium (Ga), tin (Sn), titanium (Ti), zirconium (Zr), niobium (Nb), germanium (Ge), antimony (Sb), bismuth (Bi), platinum (Pt), palladium (Pd), magnesium (Mg), zinc (Zn), or a combination thereof.

The second metal may be, for example, a metal that is not alloyable with lithium. When such a second metal is used, problems caused by the volume expansion due to the alloying of the second metal of the conformal coating layer with lithium may be prevented.

When the porous anode current collector formed under the conformal coating layer is formed of a metal having an electrical conductivity, current distribution uniformity therebetween may be improved, and a space sufficient for lithium to be electrodeposited (e.g., in a pore of the porous anode current collector) may have a short-circuit suppressing effect. Also, since the porous anode current collector is formed of a metal capable of conducting electric current, a current collector does not need to be separately used, and thus an all-solid battery having an excellent energy density may be prepared.

The porous anode current collector has pores, and a porosity of the porous anode current collector is in a range of about 50% to about 99%, about 60% to about 85%, or about 70% to about 85%. Also, a size of the pores is in a range of about 100 µm to about 2 millimeters (mm) or about 300 µm to about 1 mm. When the porosity and the size of the pores of the porous anode current collector are within these ranges, a strength of the anode current collector is stable, and thus a battery preparation process may be facilitated. The porosity and the size of the pores may be confirmed through an SEM.

Lithium metal or a lithiophilic material may be included in the pores of the porous anode current collector. Examples of the lithiophilic material may include a ceramic material such as ZnO or MgO, or a metal such as Ag, Si, Sn, or In. The lithiophilic material reacts electrochemically with lithium. In this regard, when the porous anode current collector including lithium metal or a lithiophilic material is used, irreversible capacity may be reduced or a short-circuit during charging/discharging may be prevented, and lithium dendrite growth during high-rate charging/discharging may be suppressed.

The porous anode current collector including lithium or a lithiophilic material in pores may be prepared by spraying lithium metal or a lithiophilic material in to the pores of the porous anode current collector, or by stacking a film including lithium metal or a lithiophilic material on the porous anode current collector and pressing the stack.

In some embodiments, the porous anode current collector may be a Li-free region where lithium (Li) is not included at an initial state or after the all-solid battery is discharged. As a result, although lithium or a lithiophilic material is not in the pores of the porous anode current collector, lithium or a lithium alloy may be produced by charging of the battery, and thus lithium or a lithium alloy may be present in the pores or in the pores and on a surface of the porous anode current collector.

Without a conformal coating layer, after charging/discharging the battery, a large amount of the first metal of the first anode active material layer including the first metal and carbonaceous anode active material may be dispersed, resulting in a short-circuit or an increase in resistance. However, in an all-solid battery according to this disclosure, the presence of a conformal coating layer may effectively prevent a first metal of a first anode active material layer from moving or diffusing toward the porous anode current collector.

In the all-solid battery according to an embodiment, generation of voids at an interface between the solid electrolyte layer and the anode layer may be suppressed, and interlayer separation may be reduced, thereby decreasing interfacial resistance and suppressing a short-circuit. Also, the use of the porous anode current collector may reduce an irreversible capacity decreases, enabling high capacity and facilitating high-rate charging/discharging, as well as manufacturing an all-solid battery capable of having a long lifespan by maintaining electrical conductivity in the anode layer during battery operation.

In an all-solid battery that includes a conformal coating layer but does not include the first anode active material layer, the conformal coating layer may serve as a current collector and lithium may be deposited thereon, and thus a short-circuit of the all-solid battery may occur.

A second anode active material layer may further be disposed between the porous anode current collector and the first anode active material layer. The second anode active material layer may include a carbonaceous anode active material or a combination of a carbonaceous anode active material and a second metal.

A particle size of the second metal in the second anode active material layer may be, for example, in a range of about 10 nm to about 900 nm, about 20 nm to about 800 nm, or about 40 nm to about 700 nm. Also, the particle size of the second metal may be confirmed by using a scanning electron microscope (SEM), a particle size analyzer, and a laser particle size distribution analyzer. As used herein, the term "particle size" denotes an average diameter of particles when the particles are spherical and denotes a length of a long axis when the particles are non-spherical. For example, the particle size of the second metal is a median diameter (D50) measured using a laser particle size distribution analyzer.

In the anode layer, a porosity decreases in a direction from the porous anode current collector towards the conformal coating layer. In an aspect, the porosity decreases gradually, e.g., linearly. When the anode layer has such a gradient porosity, a space for storing lithium ions may be secured and at the same time a short-circuit caused by dendrites may be prevented.

A porosity of the porous anode current collector may be in a range of about 50% to about 95%. A porosity of the first anode active material layer may be in a range of about 10% to about 50%, about 15% to about 30%, or about 15% to about 20%. A porosity of the conformal coating layer may be in a range of about 50% or less, about 40% or less, about 30% or less, about 20% or less, in a range of about 1% to about 20%, or in a range of about 5% to about 20%. A pore size of the conforming coating layer may be in a range of about 20 µm or less, about 15 µm or less, about 10 µm or less, or in a range of about 0.1 µm to about 10 µm, about 0.2 µm to about 10 µm, or about 0.4 µm to about 8 µm. In an embodiment, the porosities and the pore size herein may be confirmed by scanning electron microscopic analysis.

An electrical conductivity in the anode layer increases, e.g., gradually or linearly, in a direction from the first anode active material layer towards the conformal coating layer, where an electrical conductivity of the first anode active material layer may be in a range of about $10^3$ siemens per centimeter (S/cm) to about $10^5$ S/cm, and an electrical conductivity of the conformal coating layer may be greater than about $10^5$ S/cm or, for example, in a range of about $10^5$ S/cm to $10^{10}$ S/cm. The electrical conductivity can be determined according to ASTM B-193, "Standard Test Method for Resistivity of Electrical Conductor Materials," e.g., at 20° C., or according to ASTM E-1004, "Standard Test Method for Determining Electrical Conductivity Using the Electromagnetic (Eddy-Current) Method," e.g., at 20° C. Additional details may be determined by one of skill in the art without undue experimentation.

A total content of the metal in the anode layer according to an embodiment may increase, e.g., gradually or linearly increase, in a direction from the porous anode current collector towards the conformal coating layer.

In the porous anode current collector, an amount of the metal can be in a range of about 5 weight percent (weight %) to about 50 weight %, based on a total weight of the porous anode current collector. A lithiophilic metal can be disposed on, e.g., coated on, the porous anode current collector, and an amount of the lithiophilic metal is in a range of about 50 weight % to about 95 weight %, based on a total weight of the metal of the porous anode current collector.

In the anode layer, a total content of an amount of the first metal and the second metal increases, e.g., gradually increases, in a direction from the first anode active material layer towards the conformal coating layer, where an amount of the first metal in the first anode active material layer is in a range of about 20 weight % to about 80 weight %, based on a total weight of the first anode active material layer, and an amount of the second metal in the conformal coating layer is in a range of greater than about 80 weight % and not more than about 100 weight %, based on a total weight of the conformal coating layer.

The porous anode current collector may be at least one of copper, stainless steel, aluminum, nickel, titanium, calcined carbon, surface-treated copper or surface-treated stainless steel, where a surface treatment of the surface-treated copper or surface-treated stainless steel comprises at least one of carbon, nickel, titanium, or silver, or an aluminum-cadmium alloy. Also, an electrical conductivity of the porous anode current collector may be about $10^7$ S/m or greater, or in a range of about $10^7$ S/m to about $10^{10}$ S/m.

A ratio of a thickness of the porous anode current collector relative to a total thickness of the first anode active material layer and the conformal coating layer may be in a range of about 2:1 to about 4:1, about 2.2:1 to about 3.8:1, or about 2.5:1 to about 3.5:1. When the thicknesses are within these ranges, an all-solid battery having improved lifespan and high-rate characteristics may be manufactured.

The conformal coating layer may be formed on the solid electrolyte layer by using a second metal precursor solution, according to an embodiment. As a result, an effective interface area between the solid electrolyte layer and the anode layer, according to an embodiment, increases the actual contact area compared to when an anode layer is simply stacked on a solid electrolyte layer.

Among methods of chemically forming a conformal coating layer, the conformal coating layer may be formed by a Tollen's reaction.

In the all-solid battery according to an embodiment, a second anode active material layer may further be included between the porous anode current collector and the first anode active material layer, a third anode active material layer may further be included between the first anode active material layer and the conformal coating layer, and the second anode active material layer or the third anode active material layer may be a metal layer including lithium or a lithium alloy.

The porous anode current collector, the first anode active material layer, the conformal coating layer, and regions therebetween are Li-free regions, in which lithium (Li) is not included in the initial state or a state after the all-solid battery is discharged.

FIG. 1A is a schematic view of an embodiment of a structure of an all-solid battery 1.

Referring to FIG. 1A, the all-solid battery 1 has a conformal coating layer 22 formed on a solid electrolyte layer 30. The anode layer 20 includes a porous anode current collector 21, a first anode active material layer 23, and conformal coating layer 22.

A cathode layer 10 including a cathode active material layer 11 and a cathode current collector 12 is stacked on the solid electrolyte layer 30.

In the anode layer 20, the first anode active material layer 23 includes a first metal and a carbonaceous anode active material. Here, the first metal and the carbonaceous anode active material may be mixtures of the first metal and the carbonaceous anode active material or a first metal/carbon composite in which the first metal and the carbonaceous anode active material form a composite. The first anode active material layer 23 according to an embodiment includes a first metal/carbon composite.

The first metal may be, for example, at least one of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn), and an example of the first metal may be Ag.

For example, the carbonaceous anode active material may include amorphous carbon.

The first anode active material layer includes a composite of first particles formed of amorphous carbon and second particles formed of the first metal, and an amount of the second particles is in a range of about 1 weight % to about 50 weight %, about 2 weight % to about 50 weight %, about 3 weight % to about 50 weight % or, for example, about 5 weight % to about 50 weight % based on the total weight of the composite.

The solid electrolyte layer may include, for example, an oxide-based solid electrolyte.

The oxide-based solid electrolyte may be, for example, at least one of $Li_{1+x+y}Al_xTi_{2+x}Si_yP_{3-y}O_{12}$ (where $0<x<2$ and $0\le y<3$), $BaTiO_3$, $Pb(Zr_aTi_{1-a})O_3$(PZT)(where $0\le a\le 1$). $Pb_{1-x}La_xZr_{1-y}Ti_yO_3$ (PLZT) (where $0\le x<1$ and $0\le y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where $0<x<2$ and $0<y<3$), $Li_xAl_yTi_z(PO_4)_3$ (where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0\le x\le 1$, $0\le y\le 1$, $0\le a\le 1$, and $0\le b\le 1$), $Li_xLa_yTiO_3$ (where $0<x<2$ and $0<y<3$), $Li_2O$, $LiOH$, $Li_2CO_3$, $LiAlO_2$, $LiO_2$—$Al_2O_3$—$SiO_2$—$P_2O_5$—$TiO_2$—$GeO_2$, and $Li_{3+x}La_3M_2O_{12}$ (where M is Te, Nb, or Zr, and x is an integer of 1 to 10).

The oxide-based solid electrolyte is a garnet-type solid electrolyte of $Li_7La_3Zr_2O_{12}$ (LLZO) or $Li_{3+x}La_3Zr_{2-a}M_aO_{12}$ (M-doped LLZO, where M=Ga, W, Nb, Ta, or Al, x is an integer of 1 to 10, and $0.05<a<0.7$).

The solid electrolyte layer according to an embodiment may include an LLZO solid electrolyte.

The solid electrolyte layer may include, for example, $Li_7La_3Zr_2O_{12}$(LLZO), $Li_{6.4}La_3Zr_{1.7}W_{0.3}O_{12}$, $Li_{6.5}La_3Zr_{1.5}Ta_{0.3}O_{12}$, $Li_7La_3Zr_{1.7}W_{0.3}O_{12}$, $Li_{4.9}La_{2.5}Ca_{0.5}Zr_{1.7}Nb_{0.3}O_{12}$, $Li_{4.9}Ga_{2.1}La_3Zr_{1.7}W_{0.3}O_{12}$, $Li_{6.4}La_3Zr_{1.7}W_{0.3}O_{12}$, $Li_7La_3Zr_{1.5}W_{0.5}O_{12}$, $Li_7La_{2.75}Ca_{0.25}Zr_{1.75}Nb_{0.25}O_{12}$, $Li_7La_3Zr_{1.5}Nb_{0.50}O_{12}$, $Li_7La_3Zr_{1.5}Ta_{0.5}O_{12}$, $Li_{6.272}La_3Zr_{1.7}W_{0.3}O_{12}$, $Li_{5.39}Ga_{1.61}La_3Zr_{1.7}W_{0.3}O_{12}$, $Li_{6.5}La_3Zr_{1.5}Ta_{0.3}O_{12}$, or a combination thereof.

Hereinafter, a method of preparing an all-solid battery according to an embodiment will described in further detail.

First, one surface of the solid electrolyte layer is surface modified through acid treatment. In the acid treatment, an aqueous hydrochloric acid solution, an aqueous sulfuric acid solution, or a mixture thereof is used.

When the solid electrolyte layer is acid-treated, a part of an inorganic lithium ion conductor forming the solid electrolyte layer may be selectively eluted by the acid and thus forming a porous structure. When the porous structure is formed, lithium carbonate is removed up to a sub-surface of the solid electrolyte, and some lithium of the lithium ion conductor may be substituted. Also, a crystallinity degree of the solid electrolyte may be improved, and an average crystal grain size may increase. As a result, current concentration suppression may be prevented while not forming a metallic compound which may become a cause of a short-circuit, and thus a short-circuit occurrence at a high current density may be suppressed. In addition, a protonated inorganic lithium ion conductor is present on the surface of the solid electrolyte, and a specific surface area increases, resulting in a significant decrease in interfacial resistance with an anode.

When the inorganic lithium ion conductor is protonated by acid treatment on the surface of the solid electrolyte layer, lithium may be substituted with protons, and an amount of the protons may be in a range of about 0.01 mole percent (mol %) to about 50 mol % or, for example, about 0.1 mol % to about 20 mol %.

A conformal coating layer may be formed on the surface modified solid electrolyte layer.

The conformal coating layer may be formed by a chemical method.

The conformal coating layer may be formed by using a composition including a second metal salt, a C1 to C14, C1 to C8, or C1 to C3 aliphatic aldehyde, and sodium hydroxide. The composition may be provided on one surface of the solid electrolyte layer by immersing, spin coating, drop casting, spray coating, spray pyrolysis, solution infiltration, roll coating, dip coating, flow coating, a doctor blade method, dispensing, inkjet printing, offset printing, screen printing, pad printing, gravure printing, flexographic printing, or lithographic printing. For example, the providing of the conformal coating layer including the second metal using the composition may be performed by solution infiltration or spray coating.

The second metal salt may be a metal salt including at least one of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). The second metal salt may be, for example, a metal salt including silver, and an example of the second metal salt may be silver nitrate.

The aliphatic aldehyde may be, for example, formaldehyde or acetaldehyde.

Amounts of the second metal salt, aliphatic aldehyde, and sodium hydroxide are stoichiometrically adjusted to provide a composition of the desired conformal coating layer including the second metal.

The conformal coating layer may be obtained by Tollen's reaction shown in Reaction scheme 1 using a mixture of silver nitrate, formaldehyde, and sodium hydroxide. Reaction scheme 1

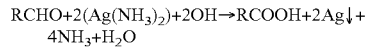

Subsequently, the resultant undergoes a washing process using an acid solution.

The acid solution may be an aqueous hydrochloric acid solution, and a concentration of the aqueous hydrochloric acid solution may be in a range of about 0.5 M to about 2 M. In this regard, the composition including the carbonaceous anode active material and the first metal is coated and dried on the surface-washed resultant to form a first anode active material layer.

The first anode active material layer may comprise carbon particles having a nanometer dimension, e.g., a dimension of 1 nm to 100 nm, and thus a lithium deposition/dissolution reaction uniformly occurs in the anode. Therefore, an anode layer formed of the conformal coating layer and the first anode active material layer may be introduced on the solid electrolyte layer, and thus long-term lifespan characteristics of the battery at high current density operation may be improved.

A cathode active material layer and a cathode current collector may be disposed on another surface of the solid electrolyte layer to prepare an all-solid battery.

In the all-solid battery according to an embodiment, an interfacial resistance between the solid electrolyte layer and the anode layer at a temperature of about 25° C. is in a range of about 20 $\Omega cm^2$ to about 100 $\Omega cm^2$, and the interfacial resistance at 60° C. is in a range of about 1 $\Omega cm^2$ to about 20 $\Omega cm^2$.

After charging the all-solid battery, lithium metal may be precipitated in pores of a porous anode current collector or a lithium metal layer may be disposed between the porous anode current collector and the first anode active material layer.

Referring to FIG. 1A, the all-solid battery 1 includes a cathode layer 10 including a cathode active material layer 12; an anode layer 20; and a solid electrolyte layer 30 that is disposed between the cathode layer 10 and the anode layer 20 and includes a solid electrolyte, wherein the anode layer 20 includes a porous anode current collector 21; a first anode active material layer 23 that is disposed on the porous anode current collector 21; and a conformal coating layer 22 disposed on the first anode active material layer 23 and contacts the solid electrolyte layer 30, wherein the conformal coating layer 22 includes a second metal, wherein the first anode active material layer 23 includes a carbonaceous anode active material and a first metal.

Anode Layer

The first anode active material layer 23 and the conformal coating layer 22 are formed on the anode current collector 21.

The carbonaceous anode active material in the first anode active material layer 23 may be, for example, in the form of particles. An average particle diameter of the carbonaceous anode active material in the form of particles may be, for example, about 4 μm or less, about 2 μm or less, about 1 μm or less, or about 900 nm or less. The average particle diameter of the carbonaceous anode active material in the form of particles may be, for example, in a range of about 10 nm to about 4 μm or less, about 10 nm to about 2 μm or less, about 10 nm to about 1 μm or less, or about 10 nm to about 900 nm. When the average particle diameter of the carbonaceous anode active material is within these ranges, reversible absorbing and/or desorbing of lithium during charging/discharging may be facilitated. The average particle diameter of the carbonaceous anode active material may be a median diameter (D50) measured using, for example, a laser particle size distribution analyzer. In some embodiments, the average particle diameter of the carbonaceous anode active material may be a mean value of sizes of the particles obtained from an SEM image.

The carbonaceous anode active material in the first anode active material layer 23 may include, for example, amorphous carbon. Examples of the amorphous carbon may be carbon black (CB), acetylene black (AB), furnace black (FB), ketjen black (KB), graphene, carbon nanotube, and carbon nanofiber, but embodiments are not limited thereto, and any material available as amorphous carbon in the art may be used.

The first anode active material layer 23 including the carbonaceous anode active material and a first metal should be construed as including a mixture of the carbonaceous anode active material and the first metal or a composite of the carbonaceous anode active material and the first metal. Here, the composite is not a simple mixture of first particles and second particles or a mixture physically bonded by a binder but may denote a result obtained by thermochemically reacting the mixture by heat-treatment or a result obtained by mechanochemically reacting the mixture by mechanical milling.

The composite of the carbonaceous anode active material and the first metal may be, for example, a composite of amorphous carbon and silver, and a mixture weight ratio of carbon to silver may be, for example, in a range of about 10:1 to about 1:2, about 5:1 to about 1:1, or about 4:1 to about 2:1, but embodiments are not limited thereto, and the mixture weight ratio may be selected according to the required characteristics of the all-solid battery 1. When the first anode active material layer 23 has this composition, cycle characteristics of the all-solid battery 1 may be improved.

A first anode active material in the first anode active material layer 23 may include, for example, a composite of first particles formed of amorphous carbon and second particles formed of a first metal. An amount of the second particles may be in a range of about 1 weight % to about 60 weight %, about 8 weight % to about 60 weight %, about 10 weight % to about 50 weight %, about 15 weight % to about 40 weight %, or about 20 weight % to about 30 weight % based on the total weight of the composite. When the amount of the second particles is within these ranges, for example, cycle characteristics of the all-solid battery 1 may be improved.

The anode active material in the first anode active material layer 23 may include, for example, a mixture of first particles formed of amorphous carbon and second particles formed of a metal or metalloid. The mixture is a simple mixture result of first particles and second particles or a mixture result of the first particles and second particles physically bonded by a binder.

An amount of the second particles may be in a range of about 8 weight % to about 60 weight %, about 10 weight % to about 50 weight %, about 15 weight % to about 40 weight %, or about 20 weight % to about 30 weight % based on the total weight of the mixture. When the amount of the second particles is within these ranges, for example, cycle characteristics of the all-solid battery 1 may be improved.

A thickness of the first anode active material layer 23 may be, for example, about 50% or less, about 40% or less, about 30% or less, about 20% or less, or about 10% or less of a thickness of the cathode active material layer 10. When a thickness of the first anode active material layer 23 is thinner than that of the cathode active material layer 11, an energy density of the all-solid battery 1 may be improved. The thickness of the first anode active material layer 23 may be, for example, in a range of about 10 nm to about 10 μm, about 100 nm to about 10 μm, about 300 nm to about 10 μm, about 500 nm to about 10 μm, about 1 μm to about 10 μm, about 1 μm to about 9 μm, or about 3 μm to about 7 μm. When the thickness of the first anode active material layer 23 is within these ranges, a short-circuit of the all-solid battery 1 may be suppressed, and cycle characteristics of the all-solid battery 1 may be improved. When the thickness of the first anode active material layer 23 is within these ranges, the first anode active material layer 23 may serve well as an anode active material layer, an energy density of the all-solid battery 1 may be improved, internal resistance of the all-solid battery 1 by the first anode active material layer 23 may be reduced, and thus cycle characteristics of the all-solid battery 1 may be improved.

The first anode active material layer 23 may further include, for example, a binder. Examples of the binder may be styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile, and polymethylmethacrylate, but embodiments are not limited thereto, and any material available as a binder in the art may be used. The binder may be formed of one of these examples of the binder alone or a plurality of different binders.

When the first anode active material layer 23 includes the binder, the first anode active material layer 23 is stabilized on the porous anode current collector 21. Also, cracks of the first anode active material layer 23 may be suppressed in spite of volume change and/or relative location change of the first anode active material layer 23 during charging/discharging. The first anode active material layer 23 may be prepared by, for example, coating and drying a slurry, in which materials forming the first anode active material layer 23 are dispersed, on the porous anode current collector 21. When the binder is included in the first anode active material layer 23, the anode active material may be stably dispersed in the slurry. For example, when the slurry is coated on the porous anode current collector 21 using a screen printing method, clogging of the screen (e.g., clogging by an aggregate of the anode active material) may be suppressed.

The porous anode current collector 21 may be formed of, for example, a material that does not react with lithium, i.e., a material that does not form either an alloy or a compound with lithium. Examples of the material forming the porous anode current collector 21 may be copper (Cu), stainless steel, titanium (Ti), iron (Fe), cobalt (Co), and nickel (Ni), but embodiments are not limited thereto, and any material available as an electrode current collector in the art may be used. The porous anode current collector 21 may be formed of one of these metals or an alloy or a material of at least two selected from these metals. The porous anode current collector 21 may be, for example, in the form of a plate or a foil.

The first anode active material layer 23 may further include additives such as a filler, a dispersant, and an ion conducting agent used in an all-solid secondary battery of the related art.

Figure 1B:
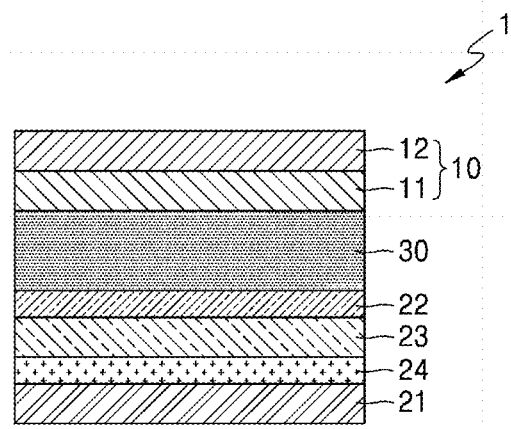
FIGS. 1B and 1C are cross-sectional views of other embodiments of the all-solid battery.

Referring to FIG. 1B, the all-solid battery 1 may further include, for example, a second anode active material layer 24 on the porous anode current collector 21. The second anode active material layer 24 is disposed between the porous anode current collector 21 and the first anode active material layer 23 and includes a lithium thin film, a lithium alloy thin film, or an element alloyable with lithium.

The lithium thin film or the lithium alloy thin film may be formed by charging the battery.

Examples of the element alloyable with lithium may be gold, silver, zinc, tin, indium, silicon, aluminum, and bismuth, but embodiments are not limited thereto, and any element alloyable with lithium in the art may be used. The thin film may be formed of one selected from these metals or an alloy of various metals. When the second anode active material layer 24 is provided on the porous anode current collector 21, cycle characteristics of the all-solid battery 1 may further be improved.

A thickness of the second anode active material layer 24 may be, for example, in a range of about 1 nm to about 800 nm, about 10 nm to about 700 nm, about 50 nm to about 600 nm, or about 100 nm to about 500 nm. When the thickness of the second anode active material layer 24 is less than about 1 nm, functions of the second anode active material layer 24 may not be exhibited. When the thickness of the second anode active material layer 24 is within these ranges, an energy density and cycle characteristics of the all-solid battery 1 may be improved. The second anode active material layer 24 may be provided on the porous anode current collector 21 by, for example, vacuum deposition, sputtering, or plating, but embodiments are not limited thereto, and any method of forming the second anode active material layer 24 in the art may be used.

Figure 1C:
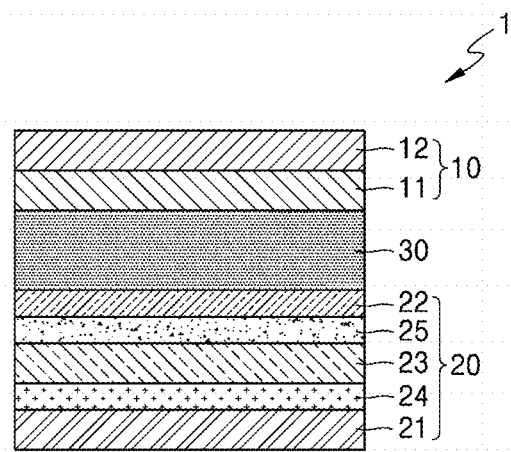

Referring to FIGS. 1B and 1C, the all-solid battery 1 may further include, for example, the second anode active material layer 24 disposed between the porous anode current collector 21 and the first anode active material layer 23 or a third anode active material layer 25 disposed between the first anode active material layer 23 and the conformal coating layer 22, by charging. The third anode active material layer 25 may be a metal layer including lithium or a lithium alloy, and the metal layer may include lithium or a lithium alloy. Accordingly, since the third anode active material layer 25 is a metal layer including lithium, the third anode active material layer 25 may serve as a lithium reservoir. Examples of the lithium alloy may be a Li—Al alloy, a Li—Sn alloy, a Li—In alloy, a Li—Ag alloy, a Li—Au alloy, a Li—Zn alloy, a Li—Ge alloy, and a Li—Si alloy.

A thickness of the third anode active material layer 25 may be, for example, in a range of about 1 μm to about 1000 μm, about 1 μm to about 200 μm, about 1 μm to about 100 μm, or about 1 μm to about 50 μm, but embodiments are not limited thereto. When the thickness of the third anode active material layer 25 is within these ranges, the third anode active material layer 25 may serve as a lithium reservoir. The third anode active material layer 25 may be, for example, a metal foil having a thickness in these ranges.

In the all-solid battery 1, the third anode active material layer 25 may be, for example, disposed between the first anode active material layer 23 and the conformal coating layer 22 before assembling the all-solid battery 1. In some embodiments, the third anode active material layer 25 may be precipitated between the first anode active material layer 23 and the conformal coating layer 22 by charging after assembling the all-solid secondary battery 1.

When the third anode active material layer 25 is disposed between the first anode active material layer 23 and the conformal coating layer 22 before assembling the all-solid secondary battery 1, the third anode active material layer 25 may serve as a lithium reservoir since the third anode active material layer 25 is a metal layer including lithium. Cycle characteristics of the all-solid battery 1 including the third anode active material layer 25 may further be improved. For example, a lithium foil may be disposed between the conformal coating layer 22 and the first anode active material layer 23 before assembling the all-solid battery 1.

When the third anode active material layer 25 is provided by charging after assembling the all-solid battery 1, an energy density of the all-solid battery 1 may increase due to not including the third anode active material layer 25 during the assembly of the all-solid battery 1. For example, the all-solid battery 1 may be charged over a charge capacity of the first anode active material layer 23 and/or the second anode active material layer 24. That is, the first anode active material layer 23 is overcharged. In the beginning of the charging, lithium is absorbed in the first anode active material layer 23. That is, an anode active material in the first anode active material layer 23 may form an alloy or a compound with lithium ions migrated from the cathode layer 10. When the first anode active material layer 23 is charged over the capacity, for example, lithium is precipitated between the porous anode current collector 21 and the first anode active material layer 23, and a metal layer corresponding to the second anode active material layer 24 may be formed by the deposited lithium. In some embodiments, when the first anode active material layer 23 is charged over the capacity, for example, lithium is precipitated on a top surface of the first anode active material layer 23, which is between the first anode active material layer 23 and the conformal coating layer 22, and a metal layer corresponding to the third anode active material layer 25 may be formed by the precipitated lithium. The third anode active material layer 25 is a metal layer mainly formed of lithium (i.e., metal lithium). This result may be obtained due to, for example, the anode active material in the first anode active material layer 23 and the conforming coating layer 22 being formed of a material forming an alloy or a compound with lithium. In discharging of the all-solid secondary battery 1, lithium of the first anode active material layer 23, which is a metal layer, is ionized and migrates in a direction to the cathode layer 10. Thus, lithium may be used as an anode active material in the all-solid secondary battery 1. Also, since the third anode active material layer 25 covers the first anode active material layer 23, the third anode active material layer 25 may serve as a protective layer of the metal layer and suppress precipitation growth of lithium dendrite at the same time. Thus, a short-circuit occurrence and capacity deterioration of the all-solid battery 1 may be suppressed, and, as a result, cycle characteristics of the all-solid battery 1 may be improved. Also, when the third anode active material layer 25 is provided by charging after assembling the all-solid battery 1, the porous anode current collector 21, the first anode active material layer 23, the conformal coating layer 22, and regions therebetween may be, for example, Li-free regions, in which lithium (Li) is not included in the initial state or a state after the all-solid battery 1 is discharged.

Solid Electrolyte Layer

Referring to FIGS. 1A to 1C, the solid electrolyte layer 30 includes a solid electrolyte between the cathode layer 10 and the anode layer 20.

The solid electrolyte may be prepared by sintering.

The solid electrolyte may be an oxide-based solid electrolyte as described above.

The solid electrolyte may be, for example, a sulfide-based solid electrolyte. An oxide-based solid electrolyte and a sulfide-based solid electrolyte may be combined and used as the solid electrolyte. The sulfide-based solid electrolyte may be, for example, at least one of $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each independently a positive integer, and Z is one of Ge, Zn, and Ga), $Li_2S$—$GeS_2$, $Li_2S$—$SiS_2$—$Li_3PO_4$, $Li_2S$—$SiS_2$—$Li_pMO_q$ (where p and q are each independently a positive integer, M is one of P, Si, Ge, B, Al, Ga, and In), $Li_{7-x}PS_{6-x}Cl_x$ (where $0 \le x \le 2$), $Li_{7-x}PS_{6-x}Br_x$ (where $0 \le x \le 2$), or $Li_{7-x}PS_{6-x}I_x$ (where $0 \le x \le 2$). The sulfide-based solid electrolyte may be prepared by melting and quenching starting materials (e.g., $Li_2S$ or $P_2S_5$), or mechanical milling the starting materials. Subsequently, the resultant may be heat-treated. The sulfide-based solid electrolyte may be amorphous or crystalline and may be a mixed form thereof.

Also, the sulfide-based solid electrolyte may include at least sulfur (S), phosphorus (P), and lithium (Li), as component elements among the sulfide-based solid electrolyte materials. For example, the sulfide-based solid electrolyte may be a material including $Li_2S$—$P_2S_5$. Here, when the material including $Li_2S$—$P_2S_5$ is used as a sulfide-based solid electrolyte material, a mixing molar ratio of $Li_2S$ and $P_2S_5$ ($Li_2S:P_2S_5$) may be, for example, selected in a range of about 50:50 to about 90:10.

The sulfide-based solid electrolyte may be an argyrodite-type compound including at least one of $Li_{7-x}PS_{6-x}Cl_x$ (where $0 \le x \le 2$), $Li_{7-x}PS_{6-x}Br_x$ (where $0 \le x \le 2$), or $Li_{7-x}PS_{6-x}I_x$ (where $0 \le x \le 2$). Particularly, the sulfide-based solid electrolyte in the solid electrolyte layer 30 may be an argyrodite-type compound including at least one of $Li_6PS_5Cl$, $Li_6PS_5Br$, or $Li_6PS_5I$.

The solid electrolyte layer 30 may further include, for example, a binder. Examples of the binder in the solid electrolyte layer 30 may include styrene butadiene rubber (SBR), polytetrafluoroethylene, polyvinylidene fluoride, or polyethylene, but embodiments are not limited thereto, and any material available as a binder in the art may be used. The binder of the solid electrolyte 30 may be the same with or different from a binder of the cathode active material layer 12 or the first anode active material layer 23.

Cathode Layer

The cathode layer 10 may include the cathode current collector 11 and the cathode active material layer 12.

The cathode current collector 11 may use, for example, a plate or foil formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode active material layer 12 may include, for example, a cathode active material. The cathode active material may be a cathode active material capable of reversibly absorbing and desorbing lithium ions. Examples of the cathode active material may include a lithium transition metal oxide such as a lithium cobalt oxide (LCO), a lithium nickel oxide, a lithium nickel cobalt oxide, a lithium nickel cobalt aluminum oxide (NCA), a lithium nickel cobalt manganese oxide (NCM), a lithium manganate, or a lithium iron phosphate; a nickel sulfide; a copper sulfide; a lithium sulfide; an iron oxide; or a vanadium oxide, but embodiments are not limited thereto, and any material available as a cathode active material in the art may be used. The cathode active material may be used alone or in a mixture of at least two selected from these examples.

The lithium transition metal oxide may be, for example, a compound represented by one of the following formulae: $Li_aA_{1-b}B'_bD_2$ (where $0.90 \le a \le 1$ and $0 \le b \le 0.5$); $Li_aE_{1-b}B'_bO_{2-c}D_c$ (where $0.90 \le a \le 1$, $0 \le b \le 0.5$, and $0 \le c \le 0.05$); $LiE_{2-b}B'_bO_{4-c}D_c$ (where $0 \le b \le 0.5$ and $0 \le c \le 0.05$); $Li_aNi_{1-b-c}Co_bB'_cD_\alpha$ (where $0.90 \le a \le 1$, $0 \le b \le 0.5$, $0 \le c \le 0.05$, and $0 < \alpha \le 2$); $Li_aNi_{1-b-c}Co_bB'_cO_{2-\alpha}F'_\alpha$ (where $0.90 \le a \le 1$, $0 \le b \le 0.5$, $0 \le c \le 0.05$, and $0 < \alpha < 2$); $Li_aNi_{1-b-c}Co_bB'_cO_{2-\alpha}F'_2$ (where $0.90 \le a \le 1$, $0 \le b \le 0.5$, $0 \le c \le 0.05$, and $0 < \alpha < 2$); $Li_aNi_{1-b-c}Mn_bB'_cD_\alpha$ (where $0.90 \le a \le 1$, $0 \le b \le 0.5$, $0 \le c \le 0.05$, and $0 < \alpha \le 2$); $Li_aNi_{1-b-c}Mn_bB'_cO_{2-\alpha}F'_\alpha$ (where $0.90 \le a \le 1$, $0 \le b \le 0.5$, $0 \le c \le 0.05$, and $0 < \alpha < 2$); $Li_aNi_{1-b-c}Mn_bB'_cO_{2-\alpha}F'_2$ (where $0.90 \le a \le 1$, $0 \le b \le 0.5$, $0 \le c \le 0.05$, and $0 < \alpha < 2$); $Li_aNi_bE_cG_dO_2$ (where $0.90 \le a \le 1$, $0 \le b \le 0.9$, $0 \le c \le 0.5$, and $0.001 \le d \le 0.1$); $Li_aNi_bCo_cMn_dG_eO_2$ (where $0.90 \le a \le 1$, $0 \le b \le 0.9$, $0 \le c \le 0.5$, $0 \le d \le 5$, and $0.001 \le e \le 0.1$); $Li_aNiG_bO_2$ (where $0.90 \le a \le 1$ and $0.001 \le b \le 0.1$); $Li_aCoG_bO_2$ (where $0.90 \le a \le 1$ and $0.001 \le b \le 0.1$); $Li_aMnG_bO_2$ (where $0.90 \le a \le 1$ and $0.001 \le b \le 0.1$); $Li_aMn_2G_bO_4$ (where $0.90 \le a \le 1$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$. In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof. The compounds may have a surface coating layer (hereinafter, also referred to as "coating layer"). Alternatively, a mixture of a compound without a coating layer and a compound having a coating layer, the compounds being selected from the compounds listed above, may be used. In some embodiments, the coating layer may include at least one compound of a coating element of an oxide, hydroxide, oxyhydroxide, oxycarbonate, or hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the cathode active material when a compound of the coating element is used. For example, the coating layer may be formed using a spray coating method or a dipping method. The coating methods may be well understood by one of ordinary skill in the art, and thus a detailed description thereof will be omitted.

The cathode active material may include, for example, a lithium salt of a transition metal oxide that has a layered rock-salt type structure among the examples of the lithium transition metal oxide. For example, the "layered rock-salt type structure" refers to a structure in which an oxygen atom layer and a metal atom layer are alternately and regularly arranged in a <111> direction in a cubic rock-salt type structure, where each of the atom layers forms a two-dimensional flat plane. The "cubic rock-salt type structure" refers to a sodium chloride (NaCl) type structure, which is one of the crystalline structures, in particular, to a structure in which face-centered cubic (fcc) lattices respectively formed of anions and cations are shifted by only a half of the ridge of each unit lattice. Examples of the lithium transition metal oxide having the layered rock-salt type structure may include a ternary lithium transition metal oxide expressed as $LiNi_xCo_yAl_zO_2$ (NCA) or $LiNi_xCo_yMn_zO_2$ (NCM) (where $0<x<1$, $0<y<1$, $0<z<1$, and $x+y+z=1$). When the cathode active material includes a ternary transition metal oxide having the layered rock-salt type structure, an energy density and thermal stability of the all-solid secondary battery 1 may be improved.

The cathode active material may be covered by a coating layer as described above. The coating layer is any material that may be used as a coating layer of a cathode active material of an all-solid secondary battery in the art. The coating layer may be, for example, $Li_2O$—$ZrO_2$.

When the cathode active material includes nickel (Ni) as a ternary lithium transition metal oxide such as NCA or NCM, a capacity density of the all-solid secondary battery 1 increases, and thus metal elution from the cathode active material in a charged state may be reduced. As a result, the all-solid secondary battery 1 according to an embodiment may have improved cycle characteristics in a charged state.

A shape of the cathode active material may be, for example, particle shapes such as a true spherical shape, an elliptical shape, or a spherical shape. A particle diameter of the cathode active material is not particularly limited but may be in a range applicable to a cathode active material of a conventional all-solid secondary battery. An amount of the cathode active material of the cathode 10 is not particularly limited and may be in a range applicable to a cathode layer of a conventional all-solid secondary battery.

Additives such as a conducting agent, a binder, a filler, a dispersant, and an ion conducting agent may be added to the cathode 10 in addition to the cathode active material. Examples of the conducting agent may include graphite, carbon black, acetylene black, ketjen black, carbon fiber, or metal powder. Examples of the binder may include styrene butadiene rubber (SBR), polytetrafluoroethylene, polyvinylidene fluoride, or polyethylene. The coating agent, the dispersant, and the ion conducting agent that may be appropriately added to the cathode 10 may be commonly known materials that are generally used in an electrode of an all-solid secondary battery in the art.

The cathode 10 may further include a solid electrolyte. The solid electrolyte in the cathode 10 may be similar to or different from a solid electrolyte in the solid electrolyte layer 30. Details of the solid electrolyte are the same as defined with reference to the solid electrolyte layer 30.

The solid electrolyte in the cathode layer 10 may be, for example, an oxide-based solid electrolyte or a sulfide-based solid electrolyte. In some embodiments, the cathode layer 10 may be, for example, impregnated with a liquid electrolyte. The liquid electrolyte may include a lithium salt and at least one of an ionic liquid or a polymer ionic liquid. The liquid electrolyte may be non-volatile. The ionic liquid refers to a salt in a liquid state at room temperature or a molten salt at room temperature which has a melting point of room temperature or lower and is only formed of ions. The ionic liquid may be a compound including a) at least one cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a mixture thereof; and b) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $CF_3SO_3^-$, $(FSO_2)_2N^-$, $(C_2F_5SO_2)_2N^-$, $(C_2F_5SO_2)(CF_3SO_2)N^-$, or $(CF_3SO_2)_2N^-$. The ionic liquid may be, for example, at least one of the group consisting of N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide. The polymer ionic liquid may have a repeating unit including a) at least one cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a mixture thereof; and b) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $C^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $CF_3SO_2)_2CH^-$, $(SF_5)_3C^-$, or $(O(CF_3)_2C_2(CF_3)_2O)_2PO^-$.

The lithium salt may be any material available as a lithium salt in the art. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each a natural number), LiCl, LiI, or a mixture thereof. A concentration of the lithium salt in the liquid electrolyte may be, for example, in a range of about 0.1 M to about 5 M. An amount of the liquid electrolyte in the cathode layer 10 may be, for example, in a range of about 0 part to about 100 parts by weight, about 0 part to about 30 parts by weight, about 0 part to about 10 parts by weight, or about 0 part to about 5 parts by weight, based on 100 parts by weight of the cathode active material layer 12 not including the liquid electrolyte.

The all-solid battery 1 may be prepared by, for example, preparing the solid electrolyte layer 30, on which the conformal coating layer 22, the first anode active material layer 23, and the porous anode current collector 21 are sequentially stacked, and disposing the cathode layer 10 on the solid electrolyte layer 30.

Preparation of Solid Electrolyte Layer/Anode Layer Stack

A composition including materials constituting the conformal coating layer 22 such as a second metal salt, a C1 to C14, C1 to C8, or C1 to C3 aliphatic aldehyde, and sodium hydroxide may be provided on the solid electrolyte layer 30 to form a conformal coating layer, and the first anode active material layer may be disposed on the conformal coating layer 22.

Subsequently, materials constituting the first anode active material layer 23 including a carbonaceous anode active material, a first metal, and optionally a binder may be added to a solvent to prepare a slurry. Here, the carbonaceous anode active material and a first metal, and the optional binder are materials for the first anode active material layer 23. The slurry may be coated and dried on the conformal coating layer 22 to form the first anode active material layer 23 on the conformal coating layer 23.

Next, the porous anode current collector 21 may be disposed on the first anode active material layer 23 and pressed to prepare a solid electrolyte layer 30/anode layer 20 stack. The pressing process may be performed by, for example, roll pressing, flat pressing, warm isotactic pressing (WIP), or cold isostatic pressing (CIP). A pressure applied in the pressing process may be, for example, in a range of about 50 Mpa to about 500 Mpa. A time of the pressing process may be from about 5 ms to about 40 min or from about 5 ms to about 10 min. The pressing process may be performed at a high temperature, for example, in a range of about 20° C. to about 90° C. or about 100° C. or higher.

Preparation of Cathode Layer

Materials constituting the cathode active material layer 12 such as a cathode active material and a binder may be added to a non-polar solvent to prepare a slurry. The slurry may be coated and dried on the cathode current collector 11. Thus obtained stack may be pressed to prepare a cathode layer 10. The pressing process may be omitted. When the pressing process is performed, the pressing process may be performed by, for example, roll pressing, flat pressing, or isostatic pressing. A mixture of the materials constituting the cathode active material layer 12 may be compressed into the form of a pellet or stretched (molded) in the form of sheet to prepare the cathode layer 10. When the cathode layer 10 is prepared in this manner, the cathode current collector 11 may be omitted. In some embodiments, the cathode layer 10 may be used as impregnated with the liquid electrolyte described above.

Preparation of Solid Electrolyte Layer

A solid electrolyte layer 30 including an oxide-based solid electrolyte may be prepared by heat-treating precursors of oxide-based solid electrolyte materials.

The oxide-based solid electrolyte may be prepared by contacting the precursors at stoichiometric amounts to form a mixture, and then heat-treating the mixture. The contacting may be, for example, performed by milling such as ball milling or pulverization. The mixture of the precursors mixed at a stoichiometric composition is primarily heat-treated in an oxidative atmosphere to prepare a primary heat-treated resultant. The primary heat-treatment may be performed at a temperature lower than about 1000° C. for about 1 hour to about 36 hours. The primary heat-treated resultant may be pulverized. The pulverizing of the primary heat-treatment may be dry pulverizing or wet pulverizing. For example, the wet pulverizing may be performed by mixing a solvent such as methanol and the primary heat-treated resultant, and milling the mixture using a ball mill for about 0.5 hours to about 10 hours. The dry pulverizing may be performed by milling the resultant using a ball mill without a solvent. A particle diameter of the primary heat-treated resultant may be in a range of about 0.1 μm to about 10 μmm, about 0.1 μm to about 8 μm or about 0.1 μm to about 5 μm. The pulverized primary heat-treated resultant may be dried. The pulverized primary heat-treated resultant is mixed with a binder solution and molded in the form of a pellet or may be simply pressed at a pressure of about 1 ton to about 10 tons to be molded in the form of a pellet.

The molded result may be secondary heat-treated at a temperature lower than about 1000° C. for about 1 hour to about 36 hours. From the secondary heat-treatment, a solid electrolyte layer 30 is obtained as a sintered product. The secondary heat-treatment may be performed at a temperature, for example, in a range of about 550° C. to about 1000° C. The secondary heat-treatment may be performed for about 1 hour to about 36 hours. A temperature of the secondary heat-treatment is higher compare to the temperature of the primary heat-treatment to obtain the sintered resultant. For example, the temperature of the secondary heat-treatment is about 10° C. or higher, about 20° C. or higher, about 30° C. or higher, or about 50° C. or higher than that of the primary heat-treatment. The molded product may be secondary heat-treated in at least one atmosphere of an oxidative atmosphere or a reductive atmosphere. The secondary heat-treatment may be performed in a) an oxidative atmosphere, b) a reductive atmosphere, or c) an oxidative atmosphere and a reductive atmosphere.

For example, the solid electrolyte layer 30 including a sulfide-based solid electrolyte may be prepared by using a solid electrolyte formed of sulfide-based solid electrolyte materials.

The sulfide-based solid electrolyte may be prepared by treating starting materials with a melt quenching method or a mechanical milling method, but embodiments are not limited thereto, and any method of preparing a sulfide-based solid electrolyte available in the art may be used. For example, when the sulfide-based solid electrolyte is prepared by using a melt quenching method, predetermined amounts of the starting materials, $Li_2S$ and $P_2S_5$, are mixed into a pellet phase, reacted at a predetermined reaction temperature in vacuum, and quenched to obtain a sulfide-based solid electrolyte. Also, the reaction temperature of the mixture of $Li_2S$ and $P_2S_5$ may be, for example, in a range of about 400° C. to about 1000° C. or about 800° C. to about 900° C. A period of time for the reaction may be in a range of about 0.1 hour to about 12 hours, or, for example, about 1 hour to about 12 hours. A temperature of the quenching may be, for example, about 10° C. or lower or, for example, about 0° C. or lower, and a rate of the quenching may be in a range of, for example, 1° C./sec to about 10000° C./sec or, for example, about 1° C./sec to about 1000° C./sec. For example, when the sulfide-based solid electrolyte is prepared by using a mechanical milling method, $Li_2S$ and $P_2S_5$ as the starting materials are mixed and reacted by using a ball mill to obtain a sulfide-based solid electrolyte. A rate and a period of time of stirring of the mechanical milling method are not particularly limited, but, when the rate of stirring is high, a production rate of the solid electrolyte increases, and, when the period of time of stirring increases, a conversion ratio from the starting materials to the solid electrolyte increases. Subsequently, the mixture obtained from the melt quenching method or the mechanical milling method is heat-treated, and then the resultant is pulverized to prepare a solid electrolyte in the form of particles. When the solid electrolyte has glass transition characteristics, the solid electrolyte may be changed from amorphous to crystalline by the heat-treatment.

Thus obtained solid electrolyte may be deposited by using a commonly known method, for example, an aerosol deposition method, a cold spray method, or a sputtering method to prepare a solid electrolyte layer 30. In some embodiments, the solid electrolyte layer 30 may be prepared by pressing a plurality of the solid electrolyte particles. In some embodiments, the solid electrolyte layer 30 may be prepared by mixing a solid electrolyte, a solvent, and a binder to prepare a mixture and then coating, drying, and pressing the mixture.

Preparation of All-Solid Battery

The anode layer 20, the cathode layer 10, and the solid electrolyte layer 30 prepared as described above are stacked such that the solid electrolyte layer 30 is disposed between the cathode layer 10 and the anode layer 20 to prepare a stack, and the stack is pressed to prepare an all-solid secondary battery 1.

For example, the anode layer 20/solid electrolyte layer 30 stack may be disposed on the cathode layer 10 such that the cathode layer 10 and the solid electrolyte layer 30 contact each other to prepare a second stack, and the second stack may be pressed to prepare an all-solid battery 10. The pressing process may be omitted or may be performed. The pressing process may be, for example, roll pressing, flat pressing, or isostatic pressing. A pressure applied in the pressing process may be in a range of about 50 Mpa to about 750 Mpa. A time for the pressing process may be in a range of about 5 ms to about 5 min. The pressing process may be performed at a temperature, for example, in a range of room temperature to about 90° C. or about 20° C. to about 90° C. In some embodiments, the pressing process may be performed at a high temperature of about 100° C. or higher. A composition and a preparation method of the all-solid secondary battery 1 are examples of embodiments, where elements of the composition and processes of the preparation method may be appropriately modified. The pressing may be omitted.

The all-solid battery according to an embodiment may be prepared by providing a solid electrolyte layer; forming a conformal coating layer including a second metal on one surface of the solid electrolyte layer including a solid electrolyte; forming a first anode active material layer including a carbonaceous anode active material and a first metal on the conformal coating layer; preparing an anode layer by arranging a porous anode current collector on the first anode active material layer; and arranging a cathode layer on another surface of the solid electrolyte layer.

The forming of the conformal coating layer may be performed by sputtering, deposition such as a chemical deposition, electrochemical deposition (plating), or a combination thereof, using second material precursors.

A chemical deposition may include precipitation, Tollen's reaction, or pyrolysis. When the pyrolysis reaction is used, silver acetate, copper nitrate, copper acetate, iron acetate, iron nitrate, copper chloride, iron chloride, magnesium acetate, magnesium nitrate, or magnesium chloride may be used as precursors.

The forming of the conformal coating layer may include providing a composition including a second metal salt, C1 to C14, C1 to C8, or C1 to C3 aliphatic aldehyde, and sodium hydroxide on one surface of the solid electrolyte layer; and drying the resultant. The drying of the resultant may be performed, for example, at a temperature in a range of about 20° C. to about 400° C., about 30° C. to about 300° C., or about 50° C. to about 200° C.

The providing of the composition on one surface of the solid electrolyte layer may be performed by solution infiltrating, immersing, spin coating, drop casting, spray coating, spray pyrolysis, roll coating, dip coating, flow coating, using a doctor blade method, dispensing, inkjet printing, offset printing, screen printing, pad printing, gravure printing, flexographic printing, or lithographic printing a mixture of a second metal salt, a C1 to C14, C1 to C8, or C1 to C3 aliphatic aldehyde, and sodium hydroxide on one surface of the solid electrolyte layer.

The forming of the first anode active material layer is coating and drying a composition of a carbonaceous material compound and a first metal on a porous anode current collector to form a first anode active material layer.

The second metal salt may be a metal salt including at least one of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn).

In some embodiments, the conformal coating layer may be obtained by Tollen's reaction using a mixture of silver nitrate, formaldehyde, and sodium hydroxide.

A lithium thin film may be stacked on the porous anode current collector to prepare a stack, and the stack may be pressed so that lithium may be present in pores of the porous anode current collector. Also, the lithium thin film may be present on a surface of the porous anode current collector.

One or more embodiments will now be described in more detail with reference to the following examples. However, these examples are not intended to limit the scope of the one or more embodiments.

EXAMPLES

Preparation of Solid Electrolyte Layer

Preparation Example 1: Preparation of LLZO Layer

A $Li_7La_3Zr_2O_{12}$ (LLZO) powder was obtained using a solid-phase method. The $Li_7La_3Zr_2O_{12}$ (LLZO) powder was prepared in the same manner as in Example 1 of U.S. Patent Publication No. 20160149260, the content of which is incorporated herein by reference in its entirety, except that $Li_2CO_3$, LiOH, $La_2O_3$, and $ZrO_2$ were used as oxide precursors.

The $Li_7La_3Zr_2O_{12}$ (LLZO) powder and lithium carbonate ($Li_2CO_3$) were uniaxial-pressed at a pressure of about 10 Mpa to form a film. An amount of lithium carbonate was about 5.5 parts by weight based on 100 parts by weight of the total weight of the $Li_7La_3Zr_2O_{12}$ (LLZO) powder and lithium carbonate ($Li_2CO_3$).

Subsequently, the film was coated with a mother powder ($Li_7La_3Zr_2O_{12}$) and then heat-treated at a temperature of about 1300° C. for 4 hours. A surface of the heat-treated film was polished using an auto polisher to prepare an LLZO film (thickness: about 495 μm).

Preparation of All-Solid Battery

Example 1

1.02 grams (g) of silver nitrate was dissolved in 50 milliliters (mL) of a solvent mixture of water and ethanol to prepare a silver nitrate solution. A mixing ratio of water and ethanol in the solvent mixture was at a volume ratio of 1:1. A few drops of saturated aqueous ammonia were added dropwise to the silver nitrate solution until the black precipitation disappeared. 20 ml of 0.2 molar (M) aqueous potassium hydroxide solution was added to the resultant, and black precipitate was thus formed. Aqueous ammonia was added to the resultant to dissolve all the black precipitate until the solution was transparent to obtain a silver nitrate solution.

Separately, 0.26 g of glucose was dissolved in 3 ml of a solvent mixture of water and ethanol (at a mixing volume ratio of water to ethanol=1:1) to obtain a glucose solution.

The silver nitrate solution and the glucose solution thus prepared were mixed and stirred, a process of solution infiltration was then performed thereon, and the resultant was washed using a solvent mixture of water and ethanol and dried at about 60° C.

Then, the dried resultant was placed on a solid electrolyte layer and pressed at a pressure of 250 Mpa and a temperature of about 25° C. by cold isostatic pressing to form an Ag layer having a thickness of about 100 nm, which was a conformal coating layer, on the solid electrolyte layer. Thus, a structure of solid electrolyte/conformal coating layer (Ag layer) was formed. Here, the LLZO ($Li_7La_3Zr_2O_{12}$) layer having a thickness of about 495 μm obtained in Preparation Example 1 was prepared as the solid electrolyte layer.

Separately, a slurry for forming a nano Ag—C coating layer as a composition for forming an anode active material layer was prepared as follows.

Carbon black (CB) having a primary particle diameter of about 38 nm and silver (Ag) particles having an average particle diameter of about 100 nm were prepared as an anode active material.

3 g of carbon black (CB) and 1 g of silver particles were added to a container, 2.692 g of a PVA-PAA binder (available from SUMITOMO SEIKA CHEMICALS CO., LTD, product name: AG binder) in 7 g of distilled water was added thereto and primarily stirred at a rate of 1000 rpm for about 30 minutes to prepare a slurry.

Separately, the slurry was spin-coated, dried at room temperature (25° C.) for 1 hour, and then vacuum-dried for about 12 hours, and thus a nano Ag—C coating layer having a thickness of about 10 μm was stacked on a stainless steel substrate. An amount of carbon in the nano Ag—C coating layer was about 70 weight %, and a porosity of the nano Ag—C coating layer was about 15%.

After stacking the nano Ag—C coating layer on the solid electrolyte layer/Ag layer structure, the stainless steel substrate was separated and removed from the structure to prepare a solid electrolyte layer/conformal coating layer (Ag layer)/nano Ag—C coating layer structure.

A lithium thin film (thickness: about 20 μm) was stacked on a top of a porous anode current collector (porosity: about 50%) formed of a copper (Cu) foil having a thickness of about 20 μm, and the resultant was pressed at a pressure of about 250 Mpa and a temperature of about 25° C. by CIP to prepare a porous anode current collector including lithium (Extra Li) in pores.

The anode current collector (porosity: 75%) including lithium in pores obtained as described above was disposed on the solid electrolyte layer/Ag layer/nano Ag—C coating layer structure and pressed at a pressure of about 250 Mpa and a temperature of about 25° C. by CIP to attach the anode current collector to the structure to prepare a solid electrolyte layer/anode layer structure.

Preparation of Cathode Layer $LiNi_{0.8}Co_{0.15}Mn_{0.05}O_2$ (NCM) as a cathode active material, polytetrafluoroethylene (Product name: Teflon® available from DuPont) as a binder, and carbon nanofibers (CNFs) as a conducting agent were prepared. Then, these materials were mixed at a weight ratio of cathode active material:conducting agent:binder=100:2:1 to obtain a mixture. The mixture was stretched into a sheet to prepare a cathode active material sheet.

The cathode active material sheet was pressed on a cathode current collector formed of an aluminum foil having a thickness of about 18 μm to prepare a cathode layer. A cathode active material layer of the prepared cathode layer was impregnated with an electrolyte solution prepared by dissolving 2.0 M of lithium bis(fluorosulfonyl)imide (LiFSI) in N-propyl-N-methyl-pyrrolidinium bis(fluorosulfonyl)imide (Pyr13FSI), which is an ionic liquid.

Preparation of All-Solid Battery

The cathode layer was disposed in a stainless steel (SUS) cap such that the cathode active material layer impregnated with the ionic liquid electrolyte solution faced upward. The solid electrolyte layer/anode layer structure having the anode layer attached thereto was disposed on the cathode layer such that the cathode active material layer was disposed on the solid electrolyte layer, and the resultant was sealed thereby completing preparation of an all-solid battery. The cathode layer and the anode layer were insulated using an insulator. Parts of the cathode current collector and the anode current collector were extruded to the outside of the sealed battery and used as terminals of a cathode layer and an anode layer, each respectively.

Example 2

An all-solid battery was prepared in the same manner as in Example 1, except that an amount of carbon in the nano Ag—C coating layer was changed to about 80 weight %.

Example 3

A solid electrolyte layer/silver layer structure and an all-solid battery were prepared in the same manner as in Example 1, except that porous anode current collector (porosity: 50%) formed of a copper (Cu) foil having a thickness of about 20 μm was used as a porous anode current collector.

The porous anode current collector did not include lithium.

Example 4

An all-solid battery was prepared in the same manner as in Example 1, except that copper nitrate ($Cu(NO_3)_2$) was used instead of silver nitrate ($AgNO_3$) during preparation of the conformal coating layer.

Example 4-1

An all-solid battery was prepared in the same manner as in Example 1, except that copper acetate was used instead of silver nitrate ($AgNO_3$) during preparation of the conformal coating layer.

Example 4-2

An all-solid battery was prepared in the same manner as in Example 1, except that magnesium acetate was used instead of silver nitrate ($AgNO_3$) during preparation of the conformal coating layer.

Example 4-3

An all-solid battery was prepared in the same manner as in Example 1, except that iron acetate was used instead of silver nitrate ($AgNO_3$) during preparation of the conformal coating layer.

Example 5

An all-solid battery was prepared in the same manner as in Example 1, except that a thickness of the conformal coating layer was changed to about 50 nm from about 100 nm.

Comparative Example 1

An all-solid battery was prepared in the same manner as in Example 1, except that an anode current collector (porosity: 0%) formed of a copper (Cu) foil having a thickness of about 10 μm was used instead of the porous anode current collector (porosity: 50%).

Comparative Example 2

An all-solid battery was prepared in the same manner as in Example 1, except that the nano Ag—C coating layer was not formed on the conformal coating layer (Ag layer).

In the battery prepared according to Comparative Example 2, the conformal coating layer functioned as a current collector, and thus a short-circuit occurred while the battery was being operated.

Comparative Example 3

A solid electrolyte layer/anode layer and an all-solid battery were prepared in the same manner as in Example 1, except that the conformal coating layer (Ag layer) was not stacked on the solid electrolyte layer.

The slurry for forming a nano Ag—C coating layer in Example 1 was spin-coated on the solid electrolyte, dried at room temperature (25° C.) for 1 hour, and then vacuum-dried for 12 hours to stack a nano Ag—C coating layer having a thickness of about 12 μm on the solid electrolyte. As a result, a solid electrolyte/nano Ag—C coating layer structure was prepared.

An anode current collector formed of a copper (Cu) foil having a thickness of about 10 μm was disposed on a solid electrolyte/nano Ag—C coating layer structure and pressed at a pressure of about 250 MPa and a temperature of about 25° C. by CIP to attach the anode current collector on the solid electrolyte/nano Ag—C coating layer structure to prepare a solid electrolyte layer/anode layer stack.

Comparative Example 4

A silver sheet was prepared using an Ag sheet having a thickness of about 2 μm as follows.

2 g of silver particles was added to a container, 1.34 g of a PVDF binder (Product name: Solef® 75130 available from Solvay) and 3 g of n-methylpyrrolidone (NMP) were added to the container, and the resultant was primarily stirred at 1200 rpm for 2 hours to prepare a slurry. The slurry solution was coated on a SUS foil (thickness: about 10 μm) using a bar coater to prepare an Ag sheet having a thickness of about 2 μm.

The Ag sheet was disposed on a solid electrolyte layer and pressed at a pressure of about 250 MPa and a temperature of about 25° C. by CIP to prepare a silver layer on the solid electrolyte layer. A $Li_7La_3Zr_2O_{12}$ (LLZO) layer having a thickness of about 495 μm was prepared as the solid electrolyte layer to form a solid electrolyte layer/Ag layer structure.

The slurry for forming a nano Ag—C coating layer in Example 1 was coated and dried to form an Ag—C coating layer on the solid electrolyte layer/Ag layer structure, thereby completing preparation of a solid electrolyte layer/Ag layer/Ag—C coating layer structure and an all-solid battery.

In the battery prepared according to Comparative Example 4, where the silver layer was formed using a silver sheet, a conformal coating layer having excellent conformality was difficult to be obtained, and thus interfacial separation between the solid electrolyte layer and the Ag—C layer was observed.

Evaluation Example 1: Interfacial Resistance

An overall resistance of each of the all-solid batteries prepared in Example 1 and Comparative Example 1 was measured. Here, an overall resistance is the sum of an interfacial resistance and an ohmic resistance.

Impedances of the all-solid batteries prepared in Example 1 and Comparative Example 1 were measured using an impedance analyzer (Solartron 1400A/1455A impedance analyzer) by a 2-probe method. A frequency range was from about 0.1 Hz to about 1 MHz, and an amplitude voltage was about 10 mV. The impedance measurement was performed in an air atmosphere at about 25° C. or about 60° C.

Figure 2A:
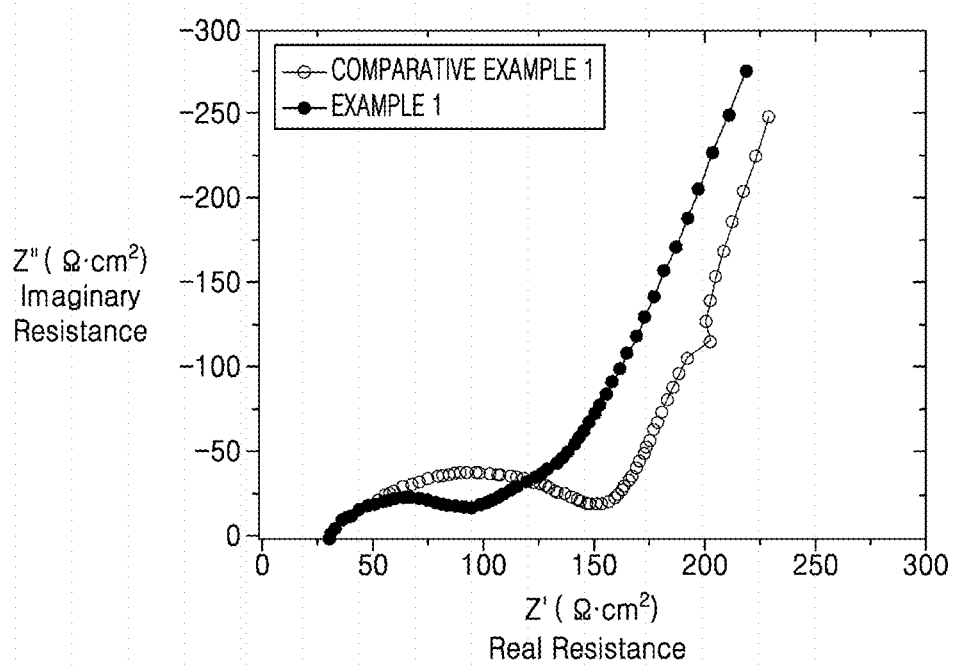
FIG. 2A is a graph of imaginary resistance Z" (ohms square centimeter, $\Omega\ cm^2$) versus real resistance Z' (ohms square centimeter, $\Omega\ cm^2$) showing impedance characteristics of all-solid batteries prepared in Example 1 and Comparative Example 1 at room temperature (25° C.)
Figure 2B:
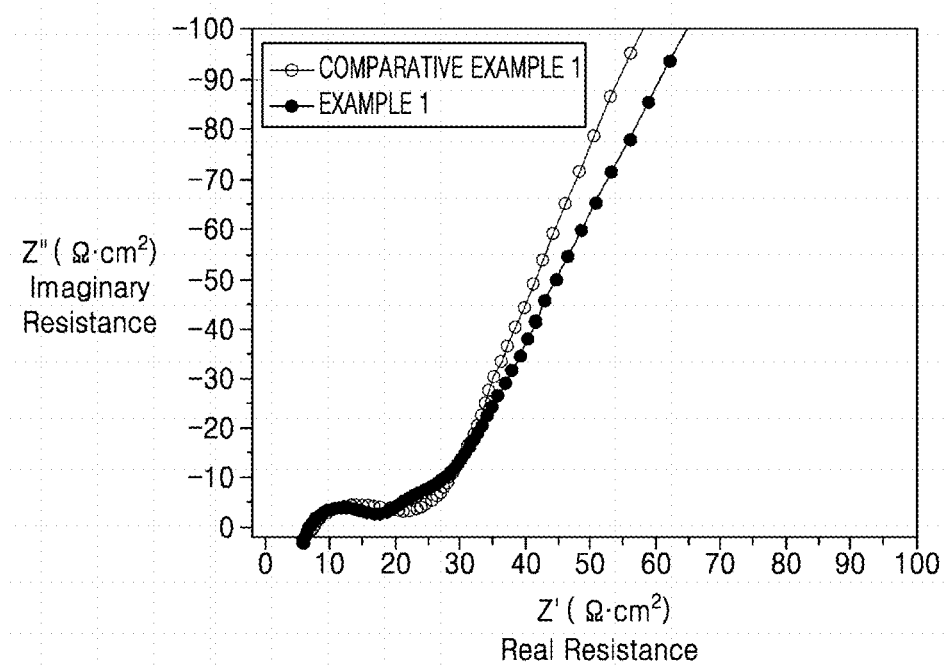
FIG. 2B is a graph of imaginary resistance Z" (ohms square centimeter, $\Omega\ cm^2$) versus real resistance Z' (ohms square centimeter, $\Omega\ cm^2$) showing impedance characteristics of the all-solid batteries prepared in Example 1 and Comparative Example 1 at 60° C.

The Nyquist plots of the results of impedance measurement of the all-solid batteries of Example 1 and Comparative Example 1 are shown in FIGS. 2A and 2B. Then, as a result of fitting the Nyquist plots to an equivalent circuit, an interfacial resistance of the all-solid battery of Comparative Example 1 is shown in Table 1.

TABLE 1

| Sample | Ag/C layer | Current collector (porosity) | Extra Li (20 μm) | Interfacial resistance ($\Omega$ cm$^2$) @ 25° C. | Interfacial resistance ($\Omega$ cm$^2$) @ 60° C. |
|---|---|---|---|---|---|
| Example 1 | ◯ | Porosity ◯ (porosity: 50%) | ◯ | 73 | 10 |
| Comparative Example 1 | ◯ | Porosity X (porosity: 0%) | X | 128 | 17 |

As shown in Table 1 and FIGS. 2A and 2B, an interfacial resistance of the all-solid battery of Example 1 decreases as compared to that of the all-solid battery of Comparative Example 1. Thus, as a result of fitting the Nyquist plots of FIGS. 2A and 2B to an equivalent circuit, an overall resistance of the all-solid battery of Comparative Example 1 was about 128 $\Omega$cm$^2$, and an overall resistance of the all-solid battery of Example 1 was about 73 $\Omega$cm$^2$. In this regard, it was confirmed that the overall resistance of the all-solid battery of Example 1 decreased as compared to that of the all-solid battery of Comparative Example 1.

Evaluation Example 2: Charge/Discharge Cycle Test

In order to confirm short-circuit prevention characteristics of a solid electrolyte, a charge/discharge cycle test was performed using a galvanostatic method.

Charge/discharge characteristics of the all-solid batteries prepared in Example 1 and Comparative Examples 1 and 2 were evaluated by the following charge/discharge test. The charge/discharge test was performed with the all-solid batteries each placed in a constant-temperature chamber of 25° C.

In the 1$^{st}$ cycle, the battery was charged with a constant current of about 0.5 C (2.2 mA/cm$^2$) until a battery voltage was about 4.3 V. Next, the battery was discharged with a constant current of about 0.5 C until a battery voltage was about 2.8 V. A C rate means a current which will discharge a battery in one hour, e.g., a C rate for a battery having a discharge capacity of 1.6 ampere-hours would be 1.6 amperes.

In the 2$^{nd}$ cycle, the battery was charged with a constant current of about 0.5 C until a battery voltage was about 4.3

V. Next, the battery was discharged with a constant current of about 0.5 C until a battery voltage was about 2.8 V.

In the 3$^{rd}$ cycle, the battery was charged with a constant current of about 0.5 C until a battery voltage was about 4.3 V. Next, the battery was discharged with a constant current of about 0.5 C until a battery voltage was about 2.8 V.

The 3$^{rd}$ cycle was repeated, and the total of 10 cycles of charging/discharging were performed on each of the batteries.

Figure 3A:
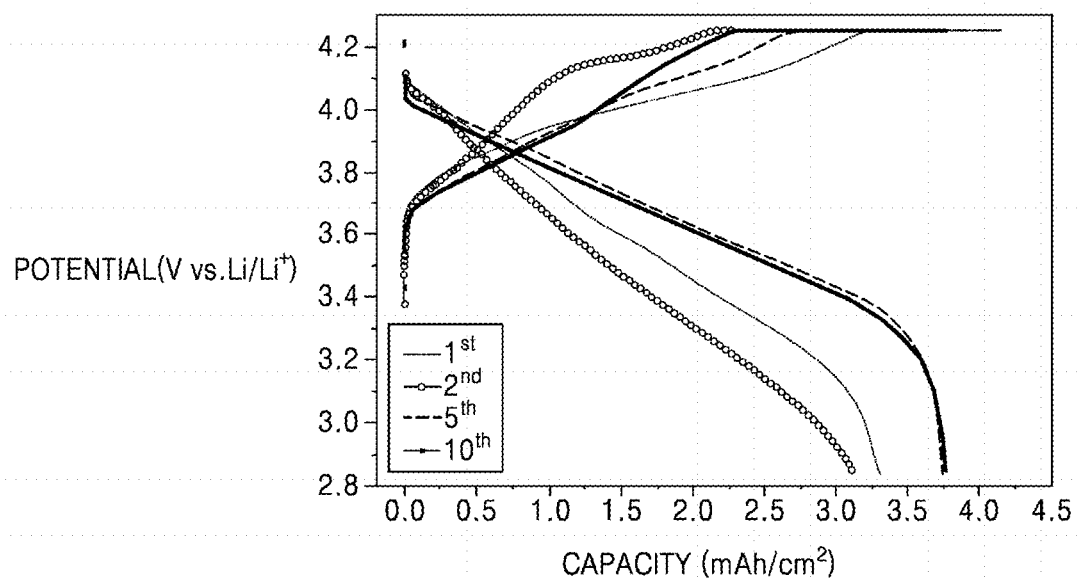
FIG. 3A is a graph of potential (Volts (V) vs. Li/Li$^+$) versus capacity (milliampere-hours per square centimeter, mAh/cm$^2$) that shows potential change according to capacity of the all-solid battery of Example 1 during a $1^{st}$, $2^{nd}$, $5^{th}$ and $10^{th}$ cycles.
Figure 3B:
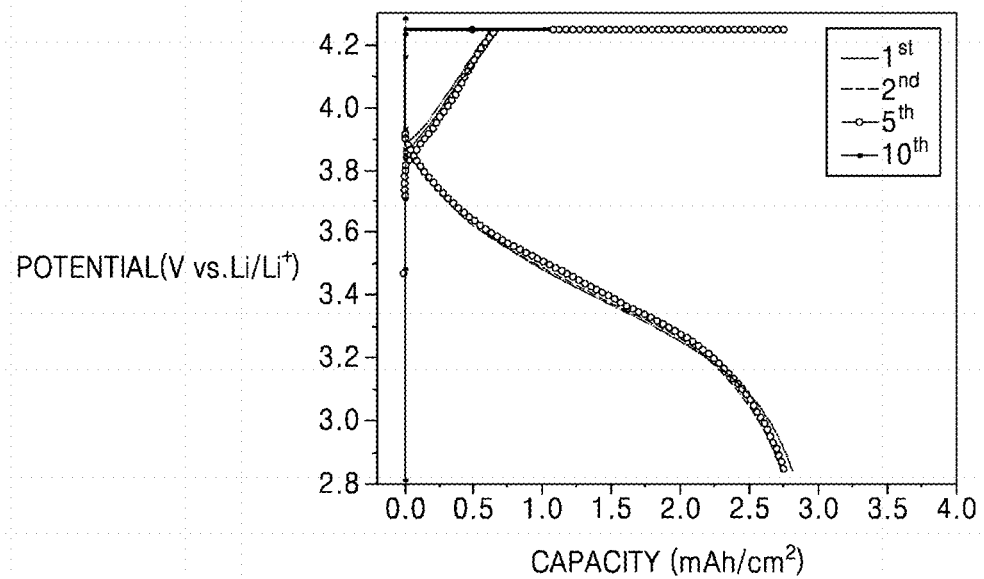
FIG. 3B is a graph of potential (Volts (V) vs. Li/Li$^+$) versus capacity (milliampere-hours per square centimeter, mAh/cm$^2$) that shows potential change according to capacity of the all-solid battery of Comparative Example 1 during a $1^{st}$, $2^{nd}$, $5^{th}$ and $10^{th}$ cycles.
Figure 3C:
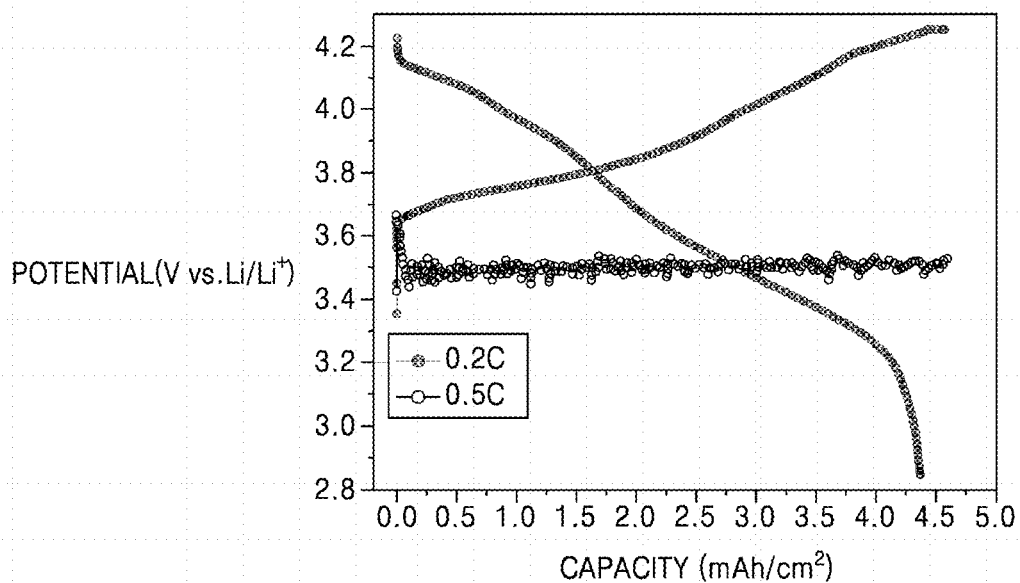
FIG. 3C is a graph of potential (Volts (V) vs. Li/Li$^+$) versus capacity (milliampere-hours per square centimeter, mAh/cm$^2$) that shows potential change according to capacity of an all-solid battery of Comparative Example 2 at 0.2 C and 0.5 C rates.

The results of the charge/discharge test of the all-solid battery of Example 1 are shown in FIG. 3A. Also, the results of the charge/discharge test performed on the all-solid batteries of Comparative Examples 1 and 2 are shown in FIGS. 3B and 3C, each respectively. In FIGS. 3A and 3B, 1$^{st}$, 2$^{nd}$, 5$^{th}$, and 10$^{th}$ denote the 1$^{st}$ cycle, 2$^{nd}$ cycle, 5$^{th}$ cycle, and 10$^{th}$ cycle, each respectively.

The all-solid battery of Example 1 exhibited a capacity retention rate without occurrence of a short-circuit at a high current density of about 1.6 mA/cm$^2$ at room temperature, and, as shown in FIG. 3A, had stable charge/discharge driving characteristics even at the 10th cycle. On the other hand, as shown in FIGS. 3B and 3C, the all-solid batteries of Comparative Examples 1 and 2 had deteriorated charge/discharge characteristics as compared with those of the all-solid battery of Example 1.

Also, times consumed for the all-solid batteries of Example 1 and Comparative Examples 1 and 2 to full charge by charging at 0.5 C rate are shown in Table 2 (1 C=4.4 mAh/cm$^2$).

TABLE 2

| Sample | Ag/C layer | Current collector | Extra Li (20 μm) | C-rate (C) | Time to Full charge (Hr) |
|---|---|---|---|---|---|
| Example 1 | ○ | Porosity (porous) ○ | ○ | 0.5 C | 1.96 |
| Comparative Example 1 | ○ | Porosity (porous) X | ○ | 0.5 C | 2.3 |
| Comparative Example 2 | X | Porosity (porous) X | ○ | 0.5 C (a short-circuit occurred immediately) | N/A |

Referring the times consumed to charge the all-solid batteries of Example 1 and Comparative Example 1 at 0.5 C shown in Table 2, the all-solid battery of Comparative Example 1 consumed 2 hours and 20 minutes and had an expression capacity of about 85%, and thus the all-solid battery of Example 1 had improved a capacity implementation rate as compared with the all-solid battery of Comparative Example 1 based on Table 2. During charging, the charging time increased due to a high resistance between the interfaces, and a capacity of the all-solid battery of Comparative Example 1 decreased. In this regard, the all-solid battery of Comparative Example 1 is disadvantageous in terms of rapid charging as compared with the all-solid battery of Example 1, and during discharging when the same current is applied, the all-solid battery of Comparative Example 1 is discharged at a higher rate, and thus the actual use time of the all-solid battery of Comparative Example 1 may have disadvantageous results as compared with those of the all-solid battery of Example 1. Also, the all-solid battery of Comparative Example 2 had a short-circuit occurred immediately as shown in Table 2.

Evaluation Example 4: Surface Roughness

Figure 5A:
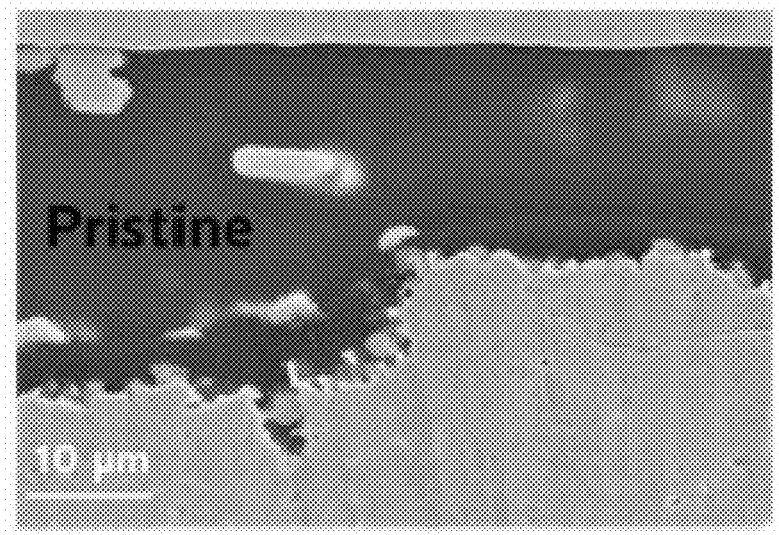
FIGS. 5A and 5B are scanning electron microscope (SEM) images of the all-solid batteries prepared in Example 1 and Comparative Example 3 respectively.
Figure 5B:
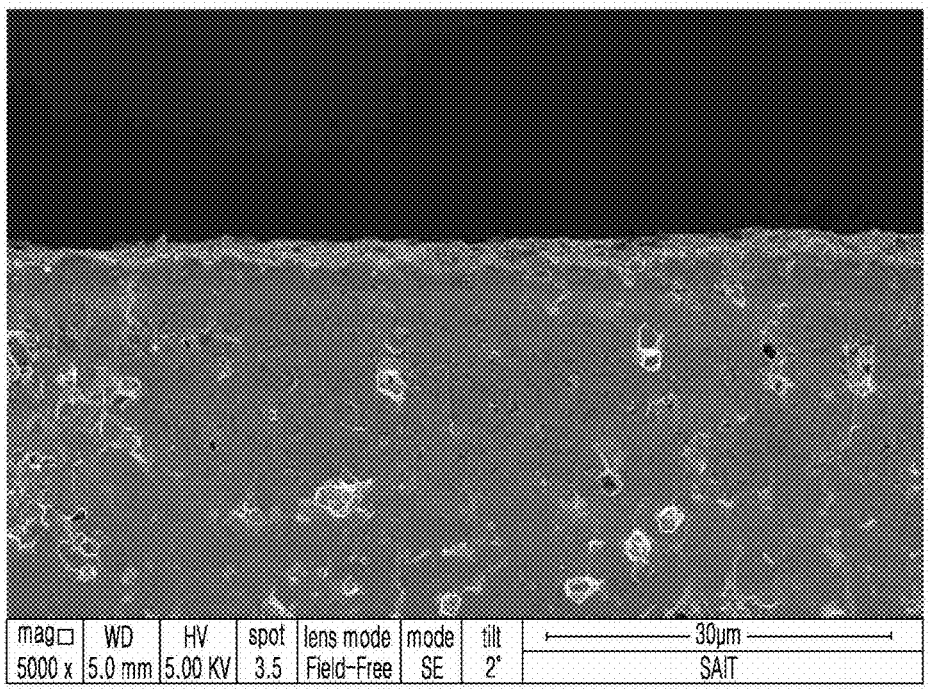

In each of the all-solid batteries prepared in Examples 1 to 3 and Comparative Examples 3 and 4, a surface roughness of the solid electrolyte layer disposed adjacent to the conformal coating layer is evaluated using a scanning electron microscope (SEM), and the results of the evaluation are shown in Table 3. The SEM images of the all-solid batteries prepared in Example 1 and Comparative Example 3 are shown in FIGS. 5A and 5B, each respectively.

TABLE 3

| Sample | Surface roughness of solid electrolyte layer (μm) |
|---|---|
| Example 1 | 2 |
| Example 2 | 2 |
| Example 3 | 2 |
| Comparative Example 3 | 20 |
| Comparative Example 4 | 20 |

Referring to Table 3, the surface roughness of the solid electrolyte layer in each of the all-solid batteries of Examples 1 to 3 was improved as compared with the surface roughness of the solid electrolyte layer in each of the all-solid batteries of Comparative Examples 3 and 4.

Figure 6A:
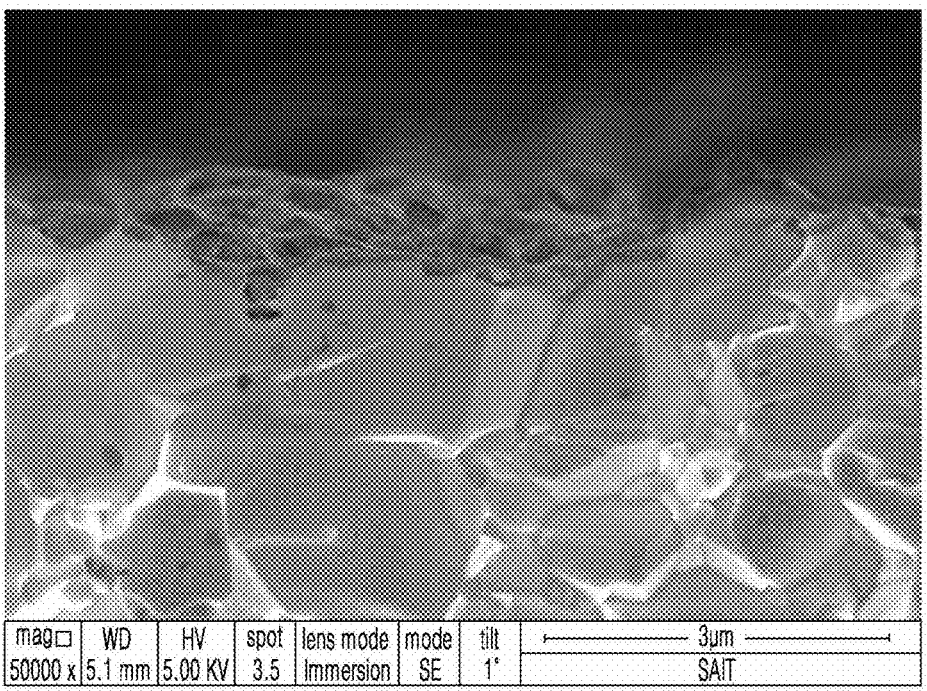
FIGS. 6A and 6B are SEM images showing a conformal coating layer in the all-solid battery of Example 1 with different magnification.
Figure 6B:
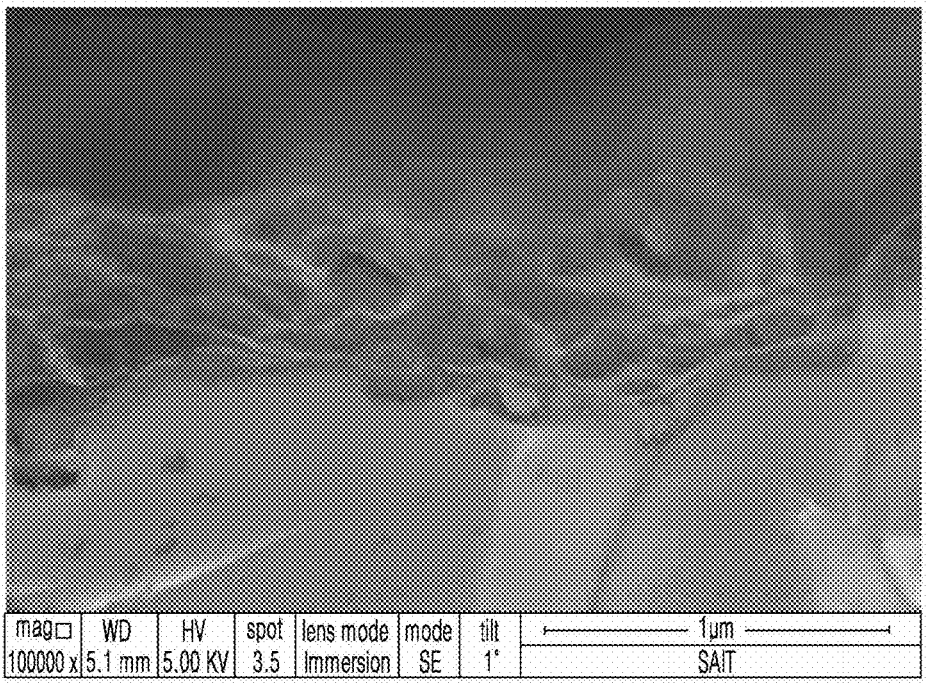

SEM images of a state of the conformal coating layer in the all-solid battery of Example 1 are as shown in FIGS. 6A and 6B. Referring to FIGS. 6A and 6B, the conformal coating layer was formed very densely.

Evaluation Example 5

An anode current collector formed of a copper (Cu) foil having a thickness of about 10 μm was disposed on a nano Ag—C coating layer structure prepared as in Example 1 and pressed at a pressure of about 250 MPa and a temperature of about 25° C. by CIP to attach the anode current collector, and thus a solid electrolyte layer/Ag layer/nano Ag—C coating layer structure was prepared.

Also, an anode current collector formed of a copper (Cu) foil having a thickness of about 10 μm was disposed on a nano Ag—C coating layer structure prepared as in Comparative Example 3 and pressed at a pressure of about 250 MPa and a temperature of about 25° C. by CIP to attach the anode current collector, and thus a solid electrolyte layer/anode layer stack was prepared.

Figure 4A:
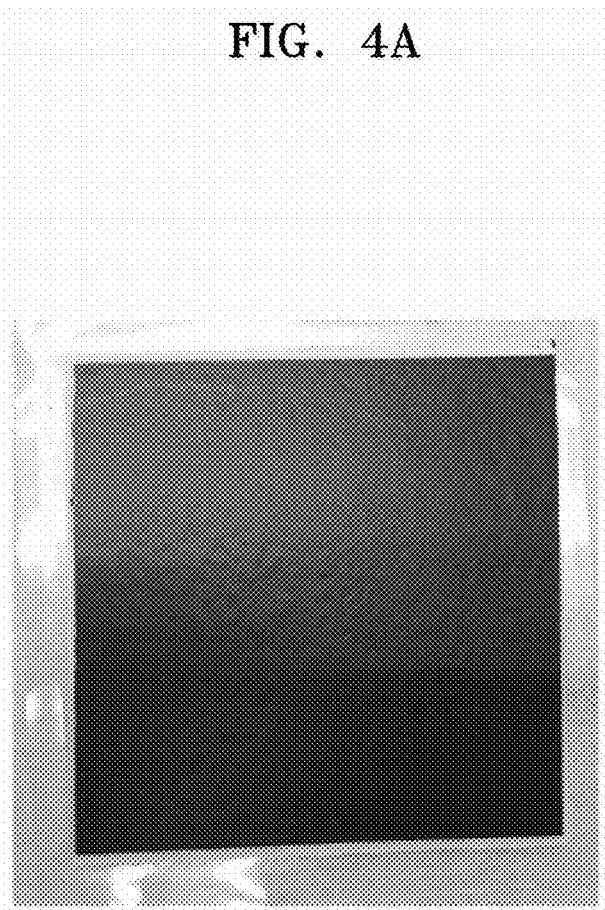
FIGS. 4A and 4B are images of structures used in preparing a stack in Example 1 and a stack in Comparative Example 3 in the state of applying cold isotactic pressure (CIP) to the stacks.
Figure 4B:
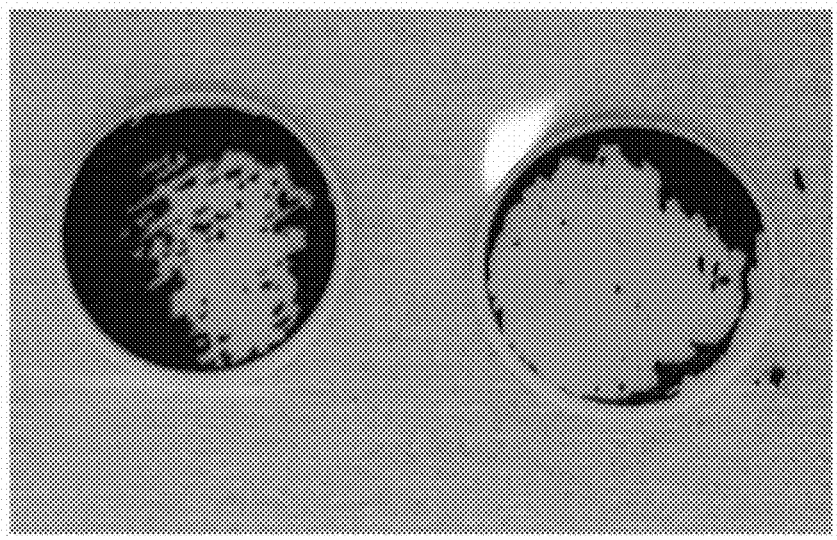

During preparation of the stack of Example 1 and the stack of Comparative Example 3, conditions of the stacks in the case of applying CIP were observed, and images of the stacks are shown in FIGS. 4A and 4B.

When the CIP was applied according to Comparative Example 3, as shown in FIG. 4B, it was visually confirmed that the solid electrolyte layer and the anode layer, i.e., nano Ag—C coating layer, are not bonded to each other but were physically separated.

On the contrary, an interlayer separation was not observed, and thus the battery prepared in Example 1 had an excellent interfacial adhesion strength between the solid electrolyte layer and the anode layer, i.e., nano Ag—C coating layer according to Example 1.

While one or more embodiments of the present disclosure have been described with reference to the figures, it will be understood by those of ordinary skill in the art that various changes and other equivalent embodiments may be made therein. Therefore, the scope of the present disclosure should be defined by the accompanying claims.

According to an aspect of an embodiment, provided is an all-solid battery, in which occurrence of interfacial voids may be suppressed during charging and discharging, separation between a solid electrolyte layer and an anode is reduced, and lifespan is improved by maintaining electrical conductivity in an anode during operation.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An all-solid battery comprising:
   a cathode layer comprising a cathode active material layer;
   an anode layer; and
   a solid electrolyte layer disposed between the cathode layer and the anode layer and comprising a solid electrolyte,
   wherein the anode layer comprises
      a porous anode current collector,
      a first anode active material layer comprising a first metal and a carbonaceous anode active material disposed on the porous anode current collector, and
      a conformal coating layer consisting of a second metal disposed on the first anode active material layer, wherein the second metal is silver, copper, iron, magnesium, or a combination thereof,
      wherein the conformal coating layer is between the first anode active material layer and the solid electrolyte layer, and
      a surface of the solid electrolyte layer proximate to the conformal coating layer has a surface roughness of about 2 micrometers or less,
   wherein a porosity of the conformal coating layer is in a range of about 1 percent to about 20 percent, and a pore size of the conformal coating layer is about 20 micrometers or less, and a thickness of the conformal coating layer is about 200 nanometers of less, and
   wherein the porous anode current collector, the first anode active material layer, the conformal coating layer, and regions therebetween are Li-free regions, which are free of lithium in an initial state or a state after the all-solid battery is discharged.

2. The all-solid battery of claim 1, wherein the surface of the solid electrolyte layer proximate to the conformal coating layer has a surface roughness in a range of about 0.1 micrometer to about 2 micrometers.

3. The all-solid battery of claim 1, wherein a conformality of the conformal coating layer is in a range of about 80 percent to about 100 percent.

4. The all-solid battery of claim 1, wherein the second metal in the conformal coating layer is silver or copper, or a combination thereof.

5. The all-solid battery of claim 1, wherein the conformal coating layer is adjacent to the solid electrolyte layer.

6. The all-solid battery of claim 1, wherein the anode layer is porous, and a porosity of the anode layer decreases in a direction from the porous anode current collector towards the conformal coating layer,
   wherein
      a porosity of the porous anode current collector is in a range of about 50 percent to about 95 percent,
      a porosity of the first anode active material layer is in a range of about 10 percent to about 50 percent,
      a porosity of the conformal coating layer is about 5 percent to about 20 percent, and
      a pore size of the conformal coating layer is about 0.1 micrometer to about 10 micrometers.

7. The all-solid battery of claim 1, wherein an electrical conductivity in the anode layer increases in a direction from the first anode active material layer towards the conformal coating layer, and
   wherein an electrical conductivity of the first anode active material layer is in a range of about $10^3$ siemens per centimeter to about $10^5$ siemens per centimeter, and
   an electrical conductivity of the conformal coating layer is greater than about $10^5$ siemens per centimeter.

8. The all-solid battery of claim 1, wherein a total content of an amount of the first metal in the anode layer increases in a direction from the first anode active material layer towards the conformal coating layer,
   wherein an amount of the first metal in the first anode active material layer is in a range of about 20 weight percent to about 80 weight percent, based on a total weight of the first anode active material layer.

9. The all-solid battery of claim 1, wherein a porosity of the porous anode current collector is in a range of about 50 percent to about 99 percent, and
   the porous anode current collector comprises a pore having a size in a range of about 100 μm to about 2 mm.

10. The all-solid battery of claim 9, further comprising lithium metal or a lithiophilic material disposed in the pore.

11. The all-solid battery of claim 1, wherein a thickness of the porous anode current collector is in a range of about 10 micrometers to about 30 micrometers, and
    a thickness of the first anode active material layer is in a range of about 10 nanometers to about 10 micrometers.

12. The all-solid battery of claim 1, wherein a ratio of a thickness of the porous anode current collector relative to a total thickness of the first anode active material layer and the conformal coating layer is in a range of about 2:1 to about 4:1.

13. The all-solid battery of claim 1, wherein the porous anode current collector comprises at least one of copper, stainless steel, aluminum, nickel, titanium, calcined carbon, surface-treated copper, or surface-treated stainless steel, wherein a surface treatment of the surface-treated copper or surface-treated stainless steel comprises at least one of carbon, nickel, titanium, silver, or an aluminum-cadmium alloy, and
    wherein an electrical conductivity of the porous anode current collector is about $10^7$ siemens per meter or more.

14. The all-solid battery of claim 1, further comprising a second anode active material layer between the porous anode current collector and the first anode active material layer.

15. The all-solid battery of claim 1 further comprising a third anode active material layer between the first anode active material layer and the conformal coating layer.

16. The all-solid battery of claim 1, wherein the first anode active material layer comprises a mixture of the first metal and the carbonaceous anode active material, or is a first metal-carbon composite.

17. The all-solid battery of claim 1, wherein the first metal of the first anode active material layer is at least one of indium, silicon, gallium, tin, aluminum, titanium, zirconium, niobium, germanium, antimony, bismuth, gold, platinum, palladium, magnesium, silver, or zinc.

18. The all-solid battery of claim 1, wherein the carbonaceous anode active material comprises amorphous carbon.

19. The all-solid battery of claim 16, wherein the first anode active material layer comprises the first metal-carbon composite, and the first metal-carbon composite is a composite of first particles comprising amorphous carbon and second particles comprising the first metal,
wherein an amount of the second particles is in a range of about 1 weight percent to about 50 weight percent, based on the total weight of the first metal-carbon composite.

20. The all-solid battery of claim 1 further comprising
a second anode active material layer between the porous anode current collector and the first anode active material layer, and a third anode active material layer between the first anode active material layer and the conformal coating layer,
wherein the second anode active material layer is a metal layer comprising lithium or a lithium alloy.

21. The all-solid battery of claim 1, wherein the solid electrolyte is an oxide solid electrolyte or a sulfide solid electrolyte.

22. The all-solid battery of claim 21, wherein the oxide solid electrolyte is at least one of $Li_{1+x+y}Al_xTi_{2-x}Si_yP_{3-y}O_{12}$, wherein $0<x<2$ and $0\leq y<3$, $BaTiO_3$, $Pb(Zr_aTi_{1-a})O_3$ wherein $0\leq a\leq 1$, $Pb_{1-x}La_xZr_{1-y}Ti_yO_3$, wherein $0\leq x<1$ and $0\leq y<1$, $Pb(Mg_{1/3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$, wherein $0<x<2$ and $0<y<3$, $Li_xAl_yTi_z(PO_4)_3$, wherein $0<x<2$, $0<y<1$, and $0<z<3$, $Li_{1+x+y}(Al_aGa_{1-a})_x(Ti_bGe_{1-b})_{2-x}Si_yP_{3-y}O_{12}$, wherein $0\leq x\leq 1$, $0\leq y\leq 1$, $0\leq a\leq 1$, and $0\leq b\leq 1$, $Li_xLa_yTiO_3$, wherein $0<x<2$ and $0<y<3$, $Li_2O$, $LiOH$, $Li_2CO_3$, $LiAlO_2$, $Li_2O$—$Al_2O_3$—$SiO_2$—$P_2O_5$—$TiO_2$—$GeO_2$, or $Li_{3+x}La_3M_2O_{12}$, wherein M is Te, Nb, or Zr, and x is an integer of 1 to 10.

23. The all-solid battery of claim 21, wherein the oxide solid electrolyte is a garnet-type solid electrolyte of $Li_7La_3Zr_2O_{12}$ or $Li_{3+x}La_3Zr_{2-a}M_aO_{12}$, wherein M is Ga, W, Nb, Ta, or Al, x is an integer of 1 to 10, and $0.05\leq a\leq 0.7$.

24. The all-solid battery of claim 1, wherein the porous anode current collector has pores, and lithium metal is precipitated in the pores of the porous anode current collector or a lithium metal layer is disposed between the porous anode current collector and the first anode active material layer after charging of the all-solid battery.

25. An all-solid battery comprising:
a cathode layer comprising a cathode active material layer;
an anode layer; and
a solid electrolyte layer disposed between the cathode layer and the anode layer and comprising a solid electrolyte,
wherein the anode layer comprises
a porous anode current collector,
a first anode active material layer comprising a first metal and a carbonaceous anode active material disposed on the porous anode current collector, the first metal comprising at least one of indium, silicon, gallium, tin, aluminum, titanium, zirconium, niobium, germanium, antimony, bismuth, gold, platinum, palladium, magnesium, silver, or zinc, and
a conformal coating layer including consisting a second metal disposed on the first anode active material layer, the second metal in the conformal coating layer comprising is silver, copper, magnesium, iron, or a combination thereof,
wherein the conformal coating layer is between the first anode active material layer and the solid electrolyte layer, and has a thickness of about 200 nanometers or less, and
a surface of the solid electrolyte layer proximate to the conformal coating layer has a surface roughness of about 2 micrometers or less,
wherein a porosity of the conformal coating layer is in a range of about 1 percent to about 20 percent, and a pore size of the conformal coating layer is about 20 micrometers or less, and
wherein the porous anode current collector, the first anode active material layer, the conformal coating layer, and regions therebetween are Li-free regions, which are free of lithium in an initial state or a state after the all-solid battery is discharged.

* * * * *